United States Patent
Uekawa

(10) Patent No.: US 7,137,745 B2
(45) Date of Patent: Nov. 21, 2006

(54) SUBASSEMBLY AND OPTICAL MODULE

(75) Inventor: Masahiro Uekawa, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 71 days.

(21) Appl. No.: 10/786,024

(22) Filed: Feb. 26, 2004

(65) Prior Publication Data

US 2004/0184744 A1     Sep. 23, 2004

(30) Foreign Application Priority Data

Mar. 19, 2003  (JP)  ............................ 2003-075630
Nov. 21, 2003  (JP)  ............................ 2003-391958

(51) Int. Cl.
G02B 6/12    (2006.01)
G02B 6/26    (2006.01)
G02B 6/42    (2006.01)
G02B 6/36    (2006.01)

(52) U.S. Cl. ............................ 385/93; 385/14; 385/52; 385/88; 385/92

(58) Field of Classification Search .................. 385/18, 385/88, 50, 52, 92–93, 14, 49
See application file for complete search history.

(56) References Cited

U.S. PATENT DOCUMENTS

| | | | | |
|---|---|---|---|---|
| 5,420,953 A | * | 5/1995 | Boudreau et al. | 385/88 |
| 5,841,922 A | | 11/1998 | Iwatsuka et al. | 385/76 |
| 6,236,788 B1 | * | 5/2001 | Moisel | 385/52 |
| 6,483,969 B1 | * | 11/2002 | Yap et al. | 385/52 |
| 6,683,733 B1 | | 1/2004 | Uekawa et al. | 359/819 |
| 6,843,609 B1 | * | 1/2005 | Yonemura | 385/93 |
| 2003/0118294 A1 | * | 6/2003 | Korenaga et al. | 385/92 |

FOREIGN PATENT DOCUMENTS

| | | |
|---|---|---|
| EP | 1256830 A2 | 11/2002 |
| JP | 5-343709 | 12/1993 |
| JP | 8-23138 | 1/1996 |

OTHER PUBLICATIONS

Masahiro Uekawa et al., "Optical Member With Handling Portion and Method for Manufacturing Optical Member and Method for Mounting Optical Member and Optical Module", U.S. Appl. No. 10/724,625, filed Dec. 2, 2003.

* cited by examiner

*Primary Examiner*—Brian Healy
*Assistant Examiner*—Charlie Peng
(74) *Attorney, Agent, or Firm*—Wenderoth, Lind & Ponack, L.L.P.

(57) ABSTRACT

A subassembly includes a supporting substrate having a V-shaped groove at which a member is disposed, a laser diode mounted at the supporting substrate, and a lens element, which includes a lens portion formed at a surface of an optical substrate and a projection portion having a contour which places the projection portion in contact with the V-shaped groove at the supporting substrate when the lens element is mounted, and which is positioned relative to the laser diode. An optical module includes the subassembly, a package used to package the subassembly and an interface. The interface includes an optical fiber to be optically coupled with the laser diode via the lens element and is positioned as it comes in contact with the package.

30 Claims, 9 Drawing Sheets

SUBASSEMBLY AND OPTICAL MODULE

BACKGROUND OF THE INVENTION

1. Field of the Invention

The present invention relates to a subassembly and an optical module that are ideal in applications in optical communication systems and the like.

2. Description of the Related Art

An optical module in the related art is normally achieved by packaging a subassembly substrate at which a laser diode is mounted, a lens provided to achieve optical coupling and an optical fiber. The lens is constituted of a ball lens or an aspherical lens in most cases. Coaxial optical modules known in the related art include can-type optical modules, pigtail-type optical modules (see, for instance, Japanese Patent Laid-open Publication No. 5-343709) and receptacle-type optical modules. The optical axes are adjusted for alignment by utilizing an aligning device while monitoring the light output.

The need for optical modules achieving a higher degree of coupling efficiency that can be, at the same time, offered at lower prices have risen in recent years. The semiconductor laser module disclosed in Japanese Patent Laid-open Publication No. 8-23138, for instance, is manufactured by using fewer parts and through a simpler alignment process in order to achieve a cost reduction. More specifically, a holder having a ball lens attached thereto is utilized, and the holder and the laser package are fixed. After a ferrule in which an optical fiber is housed is set against the holder, the ferrule is aligned along directions perpendicular to the optical axis.

In addition, an optical module equipped with an isolator has been often used in recent years to prevent return light from entering the laser diode. The isolator may be constituted mainly with a Faraday rotator and polarizers mounted on the two sides of the Faraday rotator, for instance. In some cases, magnets that apply magnetic fields to the Faraday rotator are disposed around the Faraday rotator and the polarizers. An optical module equipped with an isolator usually adopts a structure in which the isolator is located toward the optical fiber end with a small light flux diameter so as to acheive miniaturization of the isolator (see, for instance, U.S. Pat. No. 5,841,922). The miniaturization of the isolator is a crucial priority since it greatly contributes to lowering the cost of the optical module and also helps to achieve miniaturization of the optical module itself.

SUMMARY OF THE INVENTION

However, it is still difficult to achieve miniaturization of the optical module in the related art described above which normally includes a lens such as a ball lens with a significant external diameter that is mounted by using a holding member such as a cap. In addition, the coupling efficiency of such an optical module is greatly compromised unless the ball lens is set at a predetermined position relative to the laser diode with a high degree of accuracy. Accordingly, an optical module that allows highly accurate positioning has been eagerly sought.

An object of the present invention, which has been achieved by addressing the problems discussed above, is to provide a new and improved subassembly and a new and improved optical module that enable highly accurate positioning and miniaturization.

In order to achieve the object described above, a first aspect of the present invention provides an optical module comprising: a supporting substrate having a groove at which a member is disposed; an optical element mounted at the supporting substrate; a lens element positioned relative to the optical element, which includes a lens portion formed at a surface of an optical substrate and a projection portion that comes in contact with the groove at the supporting substrate when the lens element is mounted; one or more package components used to package the supporting substrate mounted with the optical element and the lens element; and an interface that includes an optical fiber to be optically coupled with the optical element via the lens element and that is positioned as it comes in contact with the package component.

A second aspect of the present invention provides an optical module comprising: a supporting substrate having a groove at which a member is disposed; an optical element mounted at the supporting substrate; a lens element positioned relative to the optical element, which includes a lens portion formed at a surface of an optical substrate to cause a light flux to exit in a direction which is different from the direction of the incident light flux and a projection portion that comes in contact with the groove at the supporting substrate when the lens element is mounted; one or more package components used to package the supporting substrate mounted with the optical element and the lens element; and an interface that includes an optical fiber to be optically coupled with the optical element via the lens element, which has a diagonal end surface, and that is positioned as it comes in contact with the package component.

A third aspect of the present invention provides a subassembly comprising: a supporting substrate having a groove at which a member is disposed; a lens element that is mounted at the supporting substrate and includes a lens portion formed at a surface of an optical substrate and a projection portion which comes in contact with the groove at the supporting substrate when the lens element is mounted; and an isolator element that is mounted at the supporting substrate and has an isolator function.

A fourth aspect of the present invention provides an optical module comprising: a supporting substrate having a groove at which a member is disposed; a lens element that is mounted at the supporting substrate and includes a lens portion formed at a surface of an optical substrate and a projection portion which comes in contact with the groove at the supporting substrate when the lens element is mounted; an isolator element that is mounted at the supporting substrate and has an isolator function; and a package component having a pedestal portion. This optical module is characterized in that the supporting substrate having the lens element and the isolator element mounted thereat is set at the pedestal portion.

A fifth aspect of the present invention provides an optical module comprising: a supporting substrate having a groove at which a member is disposed; an optical element mounted at the supporting substrate; a lens element positioned relative to the optical element, which includes a lens portion formed at a surface of an optical substrate and a projection portion that comes in contact with the groove at the supporting substrate when the lens element is mounted; an isolator element that is mounted at the supporting substrate and has an isolator function; one or more package components used to package the supporting substrate mounted with the optical element, the lens element and the isolator element; and an interface that includes an optical fiber to be optically coupled with the optical element via the lens element and that is positioned as it comes in contact with the package component.

A sixth aspect of the present invention provides a subassembly comprising: a supporting substrate having a groove at which a member is disposed; a light emitting element that is mounted at the supporting substrate and emits light with a first wavelength; a lens element which includes a lens portion formed at a surface of an optical substrate and a projection portion that comes in contact with the groove at the supporting substrate when the lens element is mounted, which is positioned relative to the light emitting element and which converts divergent light emitted from the light emitting element to substantially parallel light; a wavelength dividing filter that is mounted at the supporting substrate and has a function of dividing light into different wavelengths; and a light receiving element at which light with a second wavelength having been divided through the wavelength dividing filter enters.

A seventh aspect of the present invention provides an optical module comprising: a supporting substrate having a groove at which a member is disposed; a light emitting element that is mounted at the supporting substrate and emits light with a first wavelength; a first lens element which includes a lens portion formed at a surface of an optical substrate and a projection portion that comes in contact with the groove at the supporting substrate when the lens element is mounted, which is positioned relative to the light emitting element and which converts divergent light emitted from the light emitting element to substantially parallel light; a wavelength dividing filter that is mounted at the supporting substrate and has a function of dividing light into different wavelengths; a light receiving element at which light with a second wavelength having been divided through the wavelength dividing filter enters; one or more package components used to package the supporting substrate having the light emitting element, the first lens element and the wavelength dividing filter mounted thereat and the light receiving element; a second lens element that converts the substantially parallel light to convergent light; and an interface which includes an optical fiber at which the light with the first wavelength having been converted to the convergent light enters and the light with the second wavelength exits toward the second lens element and which is positioned as it comes in contact with the package component.

An eighth aspect of the present invention provides a subassembly comprising: a supporting substrate having a first groove and a second groove adopting a first structure and a groove adopting a second structure which is positioned between the first groove and the second groove adopting the first structure; a light emitting element that is mounted at the supporting substrate and emits light with a first wavelength; a first lens element which includes a lens portion formed at a surface of an optical substrate and a projection portion that comes in contact with the first groove adopting the first structure when the first lens element is mounted, which is positioned relative to the light emitting element and which converts divergent light emitted from the light emitting element to substantially parallel light; a second lens element which includes a lens portion formed at a surface of an optical substrate and a projection portion that comes in contact with the second groove adopting the first structure when the second lens element is mounted and which converts the substantially parallel light to convergent light; a wavelength dividing filter that is disposed at the groove adopting the second structure and has a function of the dividing light into different wavelengths; and a light receiving element at which light with a second wavelength having been divided through the wavelength dividing filter enters.

A ninth aspect of the present invention provides an optical module comprising: a supporting substrate having a first groove and a second groove adopting a first structure and a groove adopting a second structure which is positioned between the first groove and the second groove adopting the first structure; a light emitting element that is mounted at the supporting substrate and emits light with a first wavelength; a first lens element which includes a lens portion formed at a surface of an optical substrate and a projection portion that comes in contact with the first groove adopting the first structure when the first lens element is mounted, which is positioned relative to the light emitting element and which converts divergent light emitted from the light emitting element to substantially parallel light; a second lens element which includes a lens portion formed at a surface of an optical substrate and a projection portion that comes in contact with the second groove adopting the first structure when the second lens element is mounted and which converts the substantially parallel light to convergent light; a wavelength dividing filter that is disposed at the groove adopting the second structure and has a function of dividing light into different wavelengths; a light receiving element at which light with a second wavelength having been divided through the wavelength dividing filter enters; one or more package components used to package the supporting substrate having the light emitting element, the first lens element, the second lens element and the wavelength dividing filter mounted thereat and the light receiving element; and an interface that includes an optical fiber at which the light with the first wavelength having been converted to the convergent light enters and the light with the second wavelength exits toward the second lens element, and is positioned as it comes in contact with the package component.

In the structures described above, the lens portions may be constituted with a diffractive optical element. The optical substrate may be a silicon crystal substrate. The optical element may be a light emitting element such as a laser diode or a light receiving element such as a photodiode. It is desirable that the supporting substrate having the various members mounted thereat be held in an airtight space. The package component may be a coaxial package component.

DETAILED DESCRIPTION OF THE PREFERRED EMBODIMENTS

Figure 1:
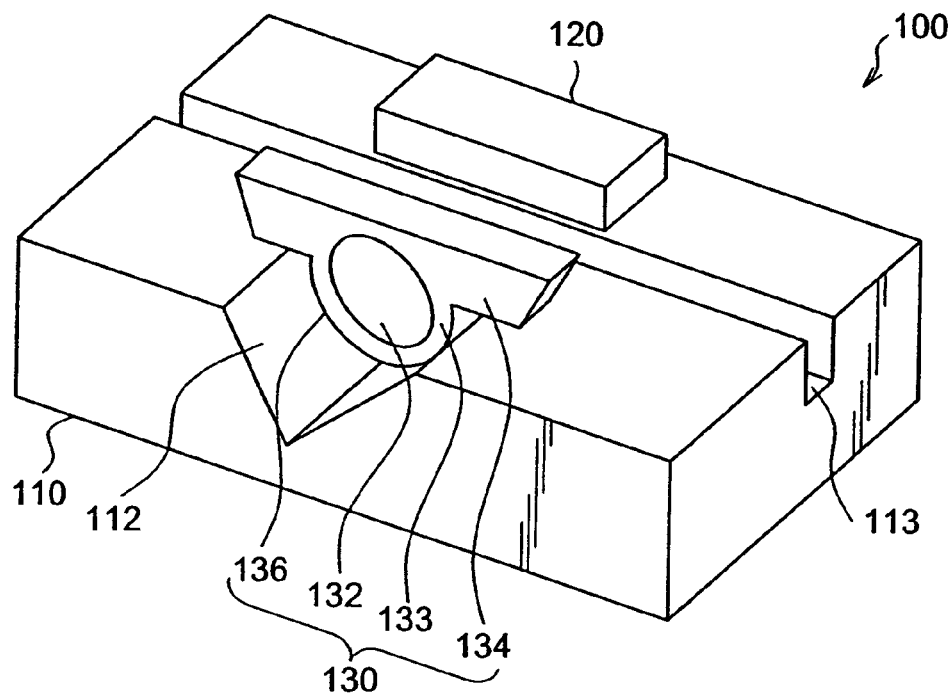
FIG. 1 is a perspective showing the structure of the subassembly achieved in a first embodiment of the present invention.

The following is a detailed explanation of the embodiments of the present invention with reference to the drawings. It is to be noted that in the following explanation and attached drawings, the same reference numerals are assigned to components having substantially identical functions and structural features to preclude the necessity for a repeated explanation thereof.

In a typical mode of the present invention, the subassembly includes a supporting substrate, an optical element and a lens element. The optical element and the lens element are mounted onto the supporting substrate. A groove at which a member is to be disposed is formed at the supporting substrate. The optical element may be, for instance, a light emitting element or a light receiving element. The lens element includes a lens portion formed at a surface of an optical substrate, and a projection portion having a shape that allows the projection portion to come into contact with the groove at the supporting substrate when the lens element is mounted. By setting the projection portion at the groove, the lens element is positioned relative to the optical element with a high degree of accuracy along a direction perpendicular to the optical axis.

In addition, in a typical mode of the present invention, the optical module comprises mainly the subassembly described above, a package component and an interface. The package component is used to package the subassembly in an airtight state. The interface is fixed onto the package component and functions as a connector terminal. The interface includes an optical fiber that is optically coupled with the optical element via the lens element. The interface is positioned as it comes in contact with the package component.

First Embodiment

Figure 2:
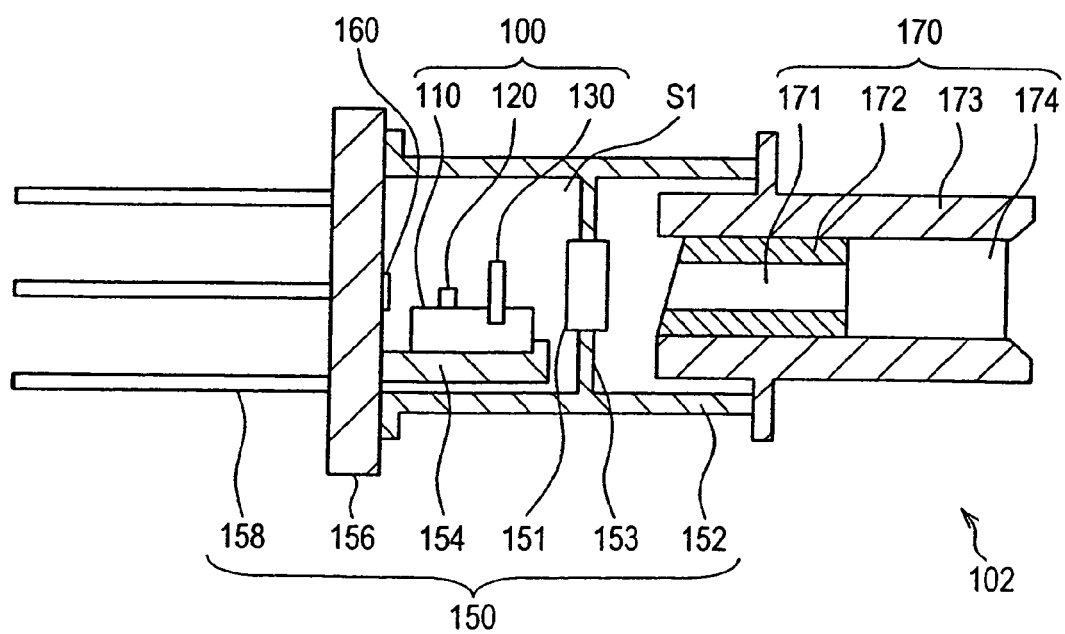
FIG. 2 is a sectional view of the structure adopted in the optical module in the first embodiment of the present invention.

The structures of the subassembly and the optical module achieved in the first embodiment of the present invention are now explained with reference to FIGS. 1 and 2. FIG. 1 is a perspective of a subassembly 100 achieved in the first embodiment of the present invention. FIG. 2 is a sectional view of an optical module 102 achieved in the first embodiment of the present invention by using the subassembly 100.

The subassembly 100 includes a supporting substrate 110, a laser diode 120 and a lens element 130.

The supporting substrate 110 may be constituted of, for instance, a silicon crystal substrate. The size of the supporting substrate 110 may be 1 mm×1 mm–2 mm×2 mm. As shown in FIG. 1, a V-shaped groove 112 having a V-shaped section is formed at the supporting substrate 110. The V-shaped groove 112, at which a member is disposed, is formed from one end of the supporting substrate 110 to extend to a middle point of the supporting substrate 110. The V-shaped groove 112 may be formed so as to achieve dimensions that allow a single mode optical fiber with a 125 µm diameter to be placed therein. The V-shaped groove 112 can be formed through, for instance, anisotropic etching. In addition, an indented groove 113 having a rectangular section is formed at the supporting substrate 110 along a direction that is perpendicular to the direction along which the V-shaped groove 112 extends. The indented groove 113 prevents light emitted from the laser diode 120 from becoming blocked.

The laser diode 120, which is a light emitting element, is disposed at an area on the supporting substrate 110 where the V-shaped groove 112 is not present, on a line extending from the V-shaped groove 112.

The lens element 130 is constituted of an optical substrate which is a silicon crystal substrate in this example. The lens element 130 is constituted mainly of a lens portion 132 formed at a surface of the optical substrate, a projection portion 136 that comes in contact with the V-shaped groove 112 when the lens element 130 is mounted, and a handling portion 134 that allows the lens element 130 to be held with ease for handling.

The lens portion 132 is constituted of a diffractive optical element formed at one surface of the optical substrate. In this embodiment, the lens portion 132 is formed in a circular shape with a diameter of, for instance, 50 to 125 µm. The lens portion 132 may be formed by using the photolithography technology and etching technology adopted in semiconductor manufacturing processes. In the following explanation, the surface of the lens element located on the side where the lens portion 132 is formed is referred to as a lens formation surface. In this example, the direction extending perpendicular to the lens formation surface matches the direction along which the optical axis extends.

An edge portion 133 located along the bottom side of the lens portion 132 constitutes part of the periphery of the lens portion 132 and assumes the shape of an arc ranging along the contour of the circumference of the lens portion 132. The contour of the arc-shaped edge portion 133 is continuously present from the lens formation surface to the surface facing opposite the lens formation surface, as the semi-cylinder constituting part of the substantially cylindrical shape, the central axis of which is the optical axis of the lens portion 132. This semi-cylindrical portion projecting downward from the middle position of the handling portion 134 is referred to as the projection portion 136. The shape of the projection portion 136 allows the projection portion 136 to fit in the V-shaped groove 112 so that the lens element 130 can be mounted at the supporting substrate 110 while the projection portion 136 is set in contact with the V-shaped groove 112. In other words, the projection portion 136 assumes a shape that allows the lens element 130 to be positioned along two directions (the X direction and the Y direction) that are perpendicular to the optical axis simply by mounting the lens element 130 with the projection portion 136 in contact with the V-shaped groove 112. It is to be noted that while the edge portion 133 is formed around the lens element 130 in this example, the edge portion 133 may instead be constituted with the external circumference of the lens portion 132.

The handling portion 134 ranging so as to surround the top side of the lens portion 132 has a greater width than the lens portion 132 within a plane substantially parallel to the surface of the lens portion 132, and assumes the shape of a bar extending to the left and the right in FIG. 1. The handling portion 134 is formed so as to constitute an integrated unit with the lens portion 132, the edge portion 133 and the projection portion 136. The upper surface of the handling portion 134 is flat and, as a result, the lens element 130 can be held from above by a means for holding with ease. The means for holding may be, for instance, a means for negative pressure holding such as a vacuum suction cup capable of vacuum holding the lens element 130.

If the wavelength of light originating from the light source of the optical system in which the lens element 130 is utilized is 1.3 μm or 1.55 μm, the ideal material to constitute the lens element 130 is a silicon crystal substrate. The lens element 130 can be manufactured through the photolithography technology and etching technology adopted in semiconductor manufacturing processes. A photolithography step and an etching step may be executed repeatedly on the silicon substrate to prepare the lens portion 132 constituted of a diffractive optical element. The substrate may then be etched until a desired depth is achieved through deep etching or the like by forming a pattern with a shape corresponding to that of the lens element 130 as a photo mask pattern to form the lens element 130. By adopting such a method, the lens element 130 can be mass produced with a high degree of accuracy at low cost.

At the subassembly 100, the laser diode 120 and the lens portion 132 of the lens element 130 are positioned and disposed so that they share a common optical axis. The lens element 130 can be positioned with ease along the two directions perpendicular to the optical axis by mounting the lens element 130 with the projection portion 136 in contact with the V-shaped groove 112. The lens portion 130 is positioned along the optical axis (the Z direction) by using image recognition technology, as explained later.

The thickness of the lens element 130 along the optical axis may be set to, for instance, 100 μm. The distance between the lens element 130 and the laser diode 120 may be, for instance, 80 μm. In addition, the length of the handling portion 134 of the lens element 130 along the major axis may be within a range of 250 to 500 μm. The lens element 130 having a lens portion constituted of a diffractive optical element, as described above, is smaller in size than lenses used in optical modules in the related art. In addition, since the distance between the optical element and the lens element, which are optically coupled, along the optical axis is greatly reduced, the light flux propagated between these elements is allowed to maintain a small diameter as a result. Thus, the subassembly 100, which includes the laser diode 120 and the lens element 130 to be optically coupled with the laser diode 120, is also extremely small in size.

Next, the optical module 102, which includes the subassembly 100, is explained with reference to FIG. 2. The optical module 102 comprises the subassembly 100, a package 150 and an interface 170. In FIG. 2, the subassembly 100 is packaged by using package parts constituting the package 150, and the interface 170 is fixed in contact with the package 150.

The package 150 is a coaxial package that includes a cap 152 having a substantially cylindrical external shape, a header 154 constituting a pedestal portion, a stem 156 having a substantially disk shape, and electrode terminals 158. One end of the header 154 is fixed onto one surface of the stem 156, whereas a stage against which the subassembly 100 is to be abutted is formed at the other end of the header 154. It is to be noted that this contact stage is not a crucial structural feature and the header may instead adopt a structure that does not include any stage. The subassembly 100 is fixed onto the header 154. A photodiode 160, which is a light receiving element, is fixed on the surface of the stem 156 located toward the header 154. The photodiode 160 is used to monitor the light traveling from the rear end surface of the laser diode 120. The laser diode 120 and the photodiode 160 are each electrically connected with an electrode terminal 158.

The cap 152 is constituted of a metal such as iron. One end of the cap 152 is fixed to the stem 156, whereas the interface 170 is fixed to the other end of the cap 152. A barrier wall 153 is formed inside the cap 152, with a flat window 151 mounted over a portion of the barrier wall 153. The flat window 151 is constituted of a material that allows the light emitted from the laser diode 120 to be transmitted. A sealed space S1 formed by the stem 156, the cap 152, the barrier wall 153 and the flat window 151 is maintained in an airtight state. The subassembly 100 is held inside the airtight space S1. The front end of the interface 170 is inserted in the space on the other side of the barrier wall 153 and the flat window 151, opposite from the side where the airtight space S1 is located. The length of the cap 152 along the optical axis is set in advance during the design stage so that when a large diameter portion of the interface 170 and the end of the cap 152 are abutted to each other, the point at which light is condensed through the lens element 130 is positioned at the end surface of an optical fiber 171.

The interface 170 is a receptacle type connector terminal having the optical fiber 171, a ferrule 172 and a sleeve 173. The end surface of the optical fiber 171 located toward the lens element 130 is formed as a diagonal surface. As a result, the light emitted from the laser diode 120 is prevented from re-entering the laser diode 120 after being reflected at this end surface and external light having traveled through the optical fiber 171 is also prevented from going back to the outside after being reflected at the end surface. The sleeve 173 constituting an external frame includes a larger diameter portion which is abutted against the end of the cap 152. The optical fiber 171 and the ferrule 172 surrounding the optical fiber 171 are inserted and fixed inside the sleeve 173, ranging from one end of the sleeve 173 to a middle point of the sleeve 173. A hollow portion 174 is formed inside the sleeve 173 to range from the middle point to the other end, and a connector (not shown) is inserted in the hollow portion.

In the optical module 102, the laser diode 120, the lens portion 132 and the optical fiber 171 are set so that they share a common optical axis. The divergent light emitted from the laser diode 120 is converted to convergent light at the lens element 130, travels through the flat window 151 and then enters the optical fiber 171 so that the light is condensed at a point at the end surface of the optical fiber 171. Thus, the laser diode 120 is optically coupled with the optical fiber 171 via the lens element 130.

The following is an explanation of an example of a manufacturing method that may be adopted to manufacture the subassembly 100 and the optical module 102. First, the supporting substrate 110 having the V-shaped groove 112 formed thereat is prepared. The laser diode 120 is then set on the supporting substrate 110 by positioning the laser diode 120 with a high degree of accuracy from above the supporting substrate 110 with a marker (not shown), and the laser diode 120 is bonded onto the supporting substrate 110 with solder or the like. Next, the lens element 130 is set with the projection portion 136 in contact with the V-shaped groove 112. With this, the lens element 130 is positioned along directions (the X direction and the Y direction) perpendicular to the optical axis. The position of the lens element 130 along the optical axis (the Z direction) is set by using a marker (not shown) provided in advance at the supporting substrate 110. Once it is verified that the lens element 130 is set at the correct position, the lens element 130 is bonded onto the V-shaped groove 112. The adhesive that may be used to bond the lens element 130 may be a thermosetting resin, a UV (ultraviolet)-setting resin or solder. Through the process described above, the subassembly 100 is manufactured.

While the accuracy with which the laser diode 120 and the lens element 130 are mounted depends upon the accuracy of the bonder, they can be mounted at an accuracy level of ±3 μm with ease. While the mounting accuracy with which the lens element 130 is mounted along the directions that are perpendicular to the optical axis is dependent upon the accuracy with which the projection portion 136 is manufactured and also the accuracy with which the V-shaped groove 112 is manufactured, the lens element 130 can be mounted at an accuracy level as high as ±1 μm.

Next, the subassembly 100 is set on the header 154, the subassembly 100 is positioned along the optical axis by abutting the subassembly 100 against the stage formed at the header 154 and the subassembly 100 is then fixed by using a thermosetting resin or solder. It is to be noted that even when no contact stage is provided, the subassembly 100 can still be mounted at the header 154 with a mounting accuracy as high as ±10 μm. Since the laser diode 120 and the lens element 130 are already aligned with each other and are positioned relative to each other, the mounting accuracy of the subassembly 100 only affects the efficiency with which the subassembly 100 and the optical fiber 171 are optically coupled with each other. When the subassembly 100 is mounted, the wiring of the laser diode 120 is electrically connected through wire bonding. Then, the cap 152 is attached and one end of the cap 152 is welded and fixed onto the stem 156. The subassembly 100 is held in the airtight space S1 in this state.

Next, the interface 170 is inserted at the other end of the cap 152 and the large diameter portion of the interface 170 is abutted against the end of the cap 152. As explained earlier, the length of the cap 152 along the optical axis is set in advance at the design stage so that the light is condensed at a point at the end surface of the optical fiber 171 in this state. Thus, by abutting the interface 170 against the end of the cap 152 in this manner, the position along the optical axis can be determined. In the abutted state, the laser diode 120 is made to emit light and the interface 170 is aligned along directions that are perpendicular to the optical axis while monitoring the light exiting the optical fiber 171. When the alignment is completed, the contact area where the large diameter portion and the cap 152 are in contact with each other is fixed through welding or the like. Through the processing described above, the optical module 102 is manufactured.

As described above, the lens element 130 is positioned with a high degree of accuracy along three directions, i.e., the X direction, the Y direction and the Z direction, relative to the laser diode 120. In particular, very precise positioning is achieved along the X direction and the Y direction with ease simply by placing the projection portion 136 at the V-shaped groove 112. As the positioning accuracy along the X direction and the Y direction greatly affects the optical coupling efficiency, an improvement in the optical coupling efficiency can be achieved in the optical module 102 adopting the structure described above. In addition, no aligning step needs to be performed along the Z direction.

The distance between the lens element 130 and the optical fiber 171 is several times the distance between the lens element 130 and the laser diode 120 in the optical module 102. When the magnifying power of the optical system is taken into consideration, the position at which the light is condensed on the side toward the optical fiber 171 greatly changes if the position of the lens element 130 along the Z direction changes even slightly relative to the laser diode 120. For instance, if the lens element 130 is not positioned relative to the laser diode 120 with accuracy and there is an error that cannot be disregarded in individual optical modules, the extent of inconsistency of the position at which the light is condensed on the side toward the optical fiber 171 becomes significant and the alignment of the optical fiber 171 along the Z direction becomes difficult. In contrast, the lens element 130 is positioned with a high degree of accuracy relative to the laser diode 120, and thus, the extent of inconsistency in the light condensing position can be minimized in the optical module 102 in the embodiment.

Figure 3:
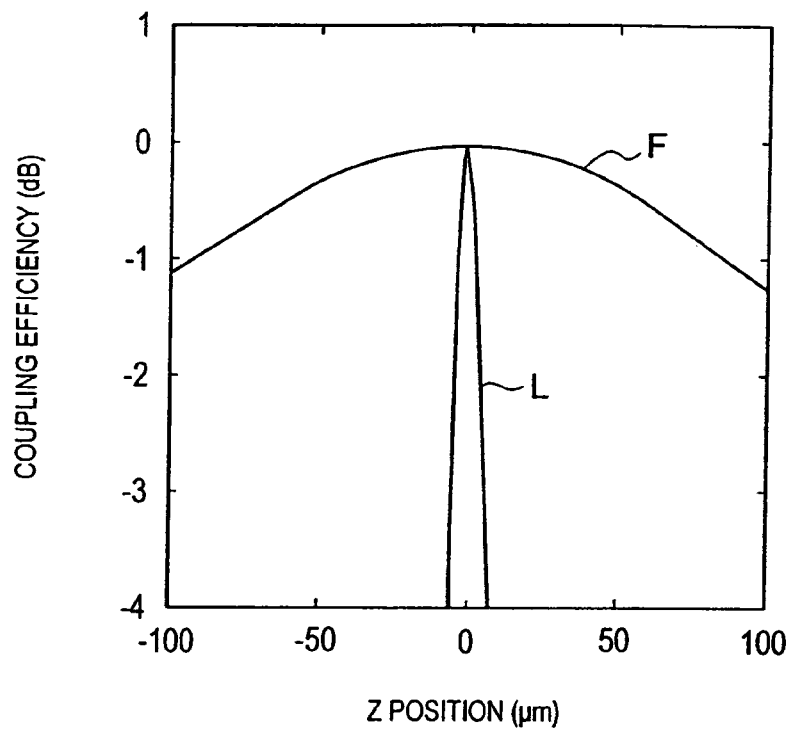
FIG. 3 shows the relationship between the position along the Z direction and the coupling efficiency.

In addition, a greater alignment tolerance is afforded with regard to the alignment of the lens element 130 and the optical fiber 171 as compared to the tolerance for the alignment of the laser diode 120 and the lens element 130. Let us now consider an example in which the distance between the laser diode 120 and the lens element 130 is approximately 80 μm and the distance between the lens element 130 and the optical fiber 171 is approximately 500 μm. FIG. 3 presents a graph of the coupling efficiency which is measured relative to the misalignment occurring along the Z direction in this situation. The horizontal axis in FIG. 3 represents the position along the Z direction, whereas the vertical axis in FIG. 3 represents the coupling efficiency. In FIG. 3, the curve L relates to the misalignment of the laser diode 120 and the lens element 130, whereas the curve F relates to the misalignment of the optical fiber 171 and the lens element 130. Both curves in FIG. 3 are normalized by setting the coupling loss at zero in correspondence to the Z position 0 indicating no misalignment. FIG. 3 indicates that even a slight extent of misalignment of the laser diode 120 and the lens element 130 results in a great reduction in the coupling efficiency. In contrast, even a large extent of misalignment between the lens element 130 and the optical fiber 171 does not significantly affect the coupling efficiency. In other words, while it is necessary to mount the laser diode 120 and the lens element 130 with a high degree of accuracy, the optical fiber 171 does not need to be mounted with such rigorous precision.

By taking these points into consideration, the optical fiber 171 is positioned along the Z direction simply by abutting the large diameter portion of the interface 170 against the end of the cap 152 and no further alignment is performed along the Z direction in the optical module 102. In addition, the lens element 130 set at the correct position along the X direction and the Y direction relative to the laser diode 120 through a very simple method. Thus, since the positioning process is simplified and only a small number of aligning steps need to be performed, the optical module 102 can be manufactured with greater ease. Ultimately, a coupling efficiency of approximately 50% is achieved between the laser diode 120 and the optical fiber 171.

As explained above, the optical module 102 in the first embodiment is provided as a highly efficient and low-cost optical module that also achieves a high level of mass productivity. In addition, since a smaller lens element constituted of a diffractive optical element is used and thus the lens size is reduced as compared to that of a ball lens, the focal length can be reduced as well in the optical module 102 in the first embodiment. As a result, it is possible to miniaturize the optical module by adopting the first embodiment.

Second Embodiment

Figure 4:
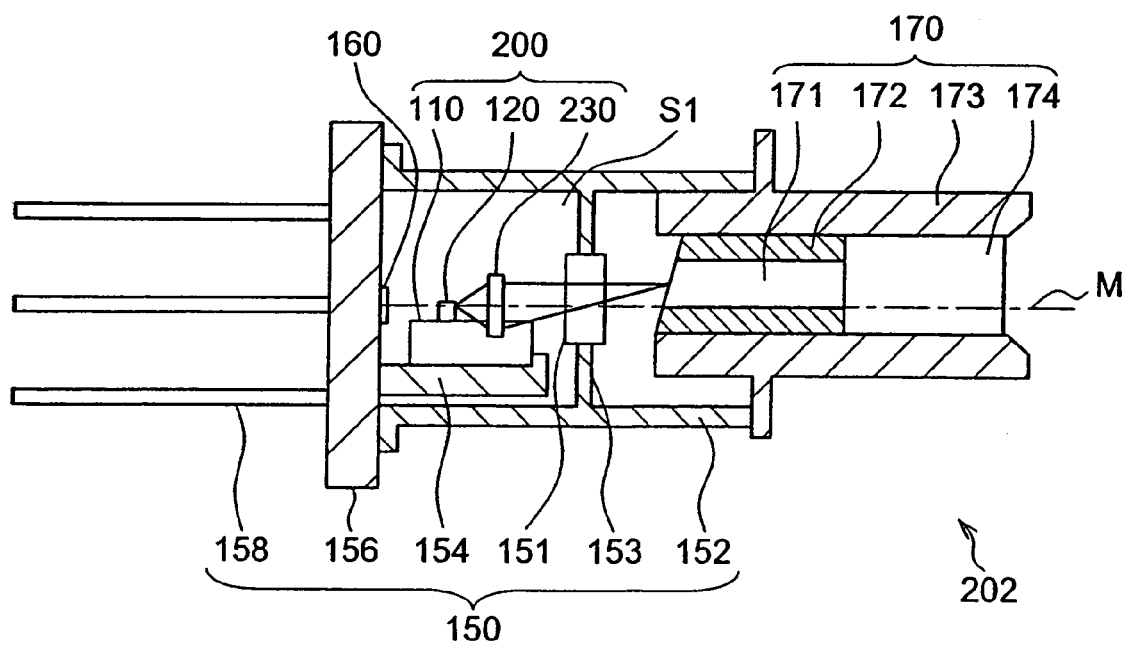
FIG. 4 is a sectional view of the structure adopted in the optical module in a second embodiment of the present invention.

Next, the subassembly and the optical module achieved in the second embodiment of the present invention are explained with reference to FIG. 4. FIG. 4 is a sectional view of an optical module 202 achieved in the second embodiment of the present invention. The optical module 202 differs from the optical module 102 in the first embodiment in that the optical system is constituted as an axial shift-type optical system. The following explanation focuses on this feature, and a repeated explanation of the structural features of the second embodiment which are identical to those of the optical module 102 is omitted.

A lens element 230 is included in a subassembly 200 constituting the optical module 202. The lens portion of the lens element 230 is constituted of a diffractive optical element that emits a light flux along a direction that is different from the direction in which the incident light flux enters. In this context, this structure is referred to as an "axial shift". The lens element 230 in this second embodiment only differs from the lens element 130 in the first embodiment in the optical performance of its lens portion, and otherwise assumes a structure which is similar to that of the lens element 130. In addition, the components other than the lens element 230 are identical to those used in the first embodiment.

In FIG. 4, the optical axis M of the laser diode 120 is indicated with a one-point chain line. The optical axis M matches the central axis of the package 150. Divergent light is emitted from the laser diode 120 as a light flux with a central axis matching the optical axis M. This divergent light is converted to convergent light at the lens portion of the lens element 230 and is also deflected so that the central axis of the light flux extends along a direction at an angle relative to the optical axis M. As described above, the direction along which the light is emitted from the lens element 230 in the second embodiment is different from the direction along which the light is emitted from the lens element 130 in the first embodiment. For this reason, the light entering the optical fiber 171 achieves an even larger angle relative to the normal line of the entry end surface of the optical fiber 171 than in the first embodiment and, as a result, the insertion loss at the optical fiber 171 can be reduced. For instance, if the entry end surface of the optical fiber 171 has an angle of 9° relative to the direction that is perpendicular to the optical axis M, optical coupling is achieved with the central axis of the light flux that has exited the lens portion, achieving an angle of 4° on the downward side relative to the optical axis M. Such an axial shift-type lens element can be manufactured with ease by designing the diffractive optical element constituting the lens portion so as to deflect light at a desired angle and forming the diffractive optical element in conformance to the design, as in the first embodiment.

The optical module 202 in the second embodiment can also be manufactured as described above for the first embodiment. After the subassembly 200 is mounted at the header 154, the interface 170 is abutted against the cap 152 to achieve positioning along the Z direction, and then alignment along the X direction and the Y direction is performed by monitoring the light emitted from the optical fiber 171. In this case, the center of the optical fiber 171 is offset from the center of the package 150. When the alignment is completed, the abutted area is fixed through welding or the like. The subassembly 200 is packaged by using package parts constituting the package 150 and is then held in the air tight space S1, as in the case of the subassembly 100 of the first embodiment.

If a ball lens or the like in the related art is used to direct light toward the end surface of the optical fiber so that the light enters the optical fiber along a direction that is different from the direction in which the optical axis M extends, a special alignment step needs to be performed to offset the lens from the central position, which is bound to complicate the manufacturing process. However, the lens element in the second embodiment only needs to be mounted by taking advantage of the external contour of the lens element, as in the first embodiment, and it is not necessary to perform any alignment step to offset the lens element from the central position. In the second embodiment, a higher level of coupling efficiency is achieved than in the first embodiment. In addition, the second embodiment provides a low-cost and compact optical module that enables highly accurate positioning, as does the first embodiment.

Third Embodiment

Figure 5A:
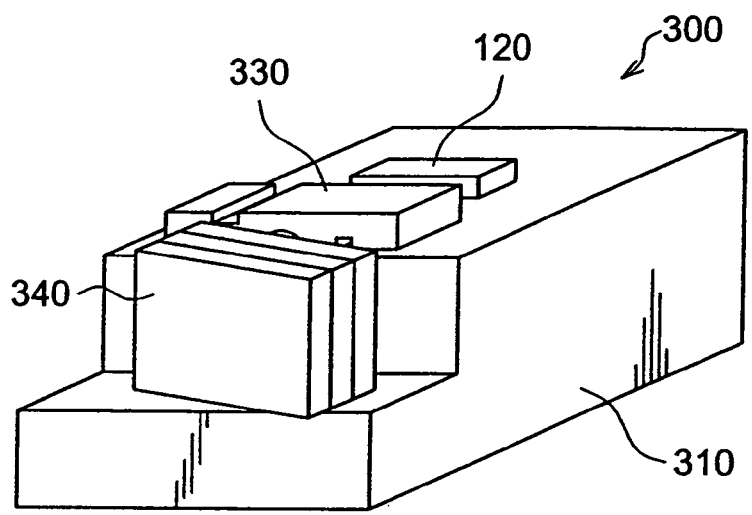
FIG. 5A is a perspective showing the structure of the subassembly achieved in a third embodiment of the present invention.
Figure 5B:
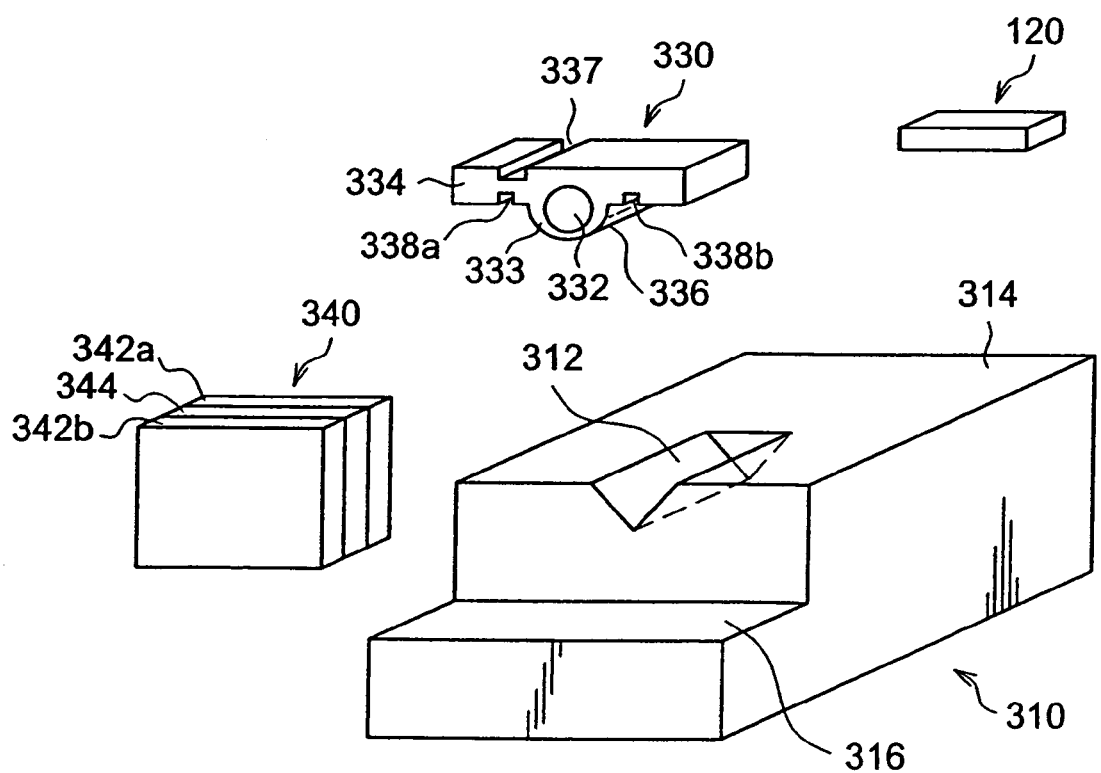
FIG. 5B is an exploded perspective showing the structure of the subassembly achieved in the third embodiment of the present invention.

Next, the subassembly and optical modules achieved in the third embodiment of the present invention are explained with reference to FIGS. 5A, 5B, 6, 7A, 7B and 8. FIG. 5A is a perspective showing the structure of a subassembly 300 achieved in the third embodiment of the present invention, and FIG. 5B is an exploded perspective of the structure of the subassembly 300. This third embodiment is characterized in that the subassembly 300 includes an isolator element. The following explanation focuses on this feature, and some structural features similar to those in the first embodiment are not explained again.

The subassembly 300 includes a supporting substrate 310, a laser diode 120, a lens element 330 and an isolator element 340. The laser diode 120, the lens element 330 and the isolator element 340 are mounted in this order over specific intervals on the supporting substrate 310.

The supporting substrate 310 is constituted of a silicon crystal substrate. As shown in FIGS. 5A and 5B, the supporting substrate 310 adopts a two-level structure that includes a stage and has a V-shaped groove 312 at which a member is to be disposed and formed thereat. In the following explanation, the upper surface of the upper level portion of the supporting substrate 310 is referred to as an upper level surface 314, whereas the upper surface of the lower level portion of the supporting substrate 310 is referred to as a lower level surface 316. The V-shaped groove 312 is formed to extend from one end of the upper level surface 314 located toward the staged side to a middle point. The stage can be formed through, for instance, dicing, and the V-shaped groove 312 can be formed through, for instance, anisotropic etching.

As shown in FIG. 5A, the lens element 330 is positioned at the V-shaped groove 312. The laser diode 120 is set at a position where the V-shaped groove 312 is not present on a line extending from the V-shaped groove 312 at the upper level surface 314. The isolator element 340 is set on the lower level surface 316. The individual components are positioned and mounted as described above.

The lens element 330 is constituted of an optical substrate which is a silicon crystal substrate in this example. As is the lens element 130 in the first embodiment, the lens element 330 is constituted mainly of a lens portion 332 formed at a surface of an optical substrate, a projection portion 336 which comes in contact with the V-shaped groove 312 when the lens element 330 is mounted and a handling portion 334 which is used to hold the lens element 330 for easy handling.

While the lens portion 332 of the lens element 330 is constituted of a diffractive optical element, its optical performance, e.g., the focal length and the target wavelength, is not necessarily the same as that of the lens portion 132 of the lens element 130 in the first embodiment. In addition, the handling portion 334 of the lens element 330 has a different shape from that of the handling portion 134 of the lens element 130. Other structural features and the method adopted to manufacture the lens element 330 are identical to those of the lens element 130.

A groove 337 that is used to identify the lens formation surface is formed at the upper surface of the handling portion 334. The groove 337, which has a section with a substantially rectangular shape and extends along a direction substantially perpendicular to the lens formation surface, is positioned on one side of the handling portion 334 instead of at the center of the handling portion 334. Thus, the handling portion 334 adopts an asymmetrical structure to the left and to the right relative to a virtual plane that contains the center of the lens portion 332 and is perpendicular to the upper surface. This asymmetry makes it possible to distinguish the lens formation surface of the lens element 330 from the opposite surface. It is to be noted that while a single groove 337 having a section with a substantially rectangular shape is provided to facilitate identification of the lens formation surface, the number of grooves and the shape of the grooves are not limited to those adopted in this example as long as asymmetry is achieved.

In addition, positioning grooves 338a and 338b are formed at the lower surface of the handling portion 334 facing opposite the upper surface, on the two sides of the projection portion 336. The grooves 338a and 338b having a section with a substantially rectangular shape and extending along a direction that is substantially perpendicular to the lens formation surface are each set on either side of the lens portion 332. The lower surface is placed in close proximity to the supporting substrate 310 when the lens element 330 is mounted at the supporting substrate 310. The grooves 338a and 338b are used for positioning along a direction that is parallel to the direction in which the V-shaped groove 312 extends when mounting the lens element 330 at the supporting substrate 310. It is to be noted that the number of positioning grooves and their shape are not limited to those adopted in the example.

The thickness of the lens element 330 along the optical axis may be set to, for instance, 100 μm. The distance between the lens element 330 and the laser diode 120 may be, for instance, 80 μm. In addition, the length of the handling portion 334 of the lens element 330 along the major axis may be within a range of 250 to 500 μm. The lens element 330 having a lens portion constituted of a diffractive optical element, as described above, is smaller in size than lenses used in optical modules in the related art. In addition, since the distances between the laser diode and the lens element, and between the laser diode and the optical fiber, which are optically coupled along the optical axis, are greatly reduced, the light flux propagated between these elements is allowed to maintain a small diameter as a result.

The laser diode 120 is a light emitting element which is set at a position so that the light emitted from the laser diode 120 enters the lens portion 332 of the lens element 330.

The isolator element 340 is constituted of polarizers 342a and 342b and a Faraday rotator 344 disposed between the polarizers 342a and 342b. The isolator element 340 has a function of an isolator whereby light advancing along a specific direction is transmitted and light advancing along the opposite direction is blocked. With this isolator function, any return light is prevented from entering the laser diode 120. In addition, the isolator element 340 is set at a slight angle of inclination relative to the optical axis to prevent return light having exited the laser diode 120 and having been reflected at the surface of the isolator element 340 from entering the laser diode 120.

As shown in FIG. 5A, the subassembly 300 adopting the structure described above is an extremely compact subassembly which still includes an isolator element 340. The overall length of the subassembly 300 along the optical axis is less than approximately 1 mm in the third embodiment.

Figure 6:
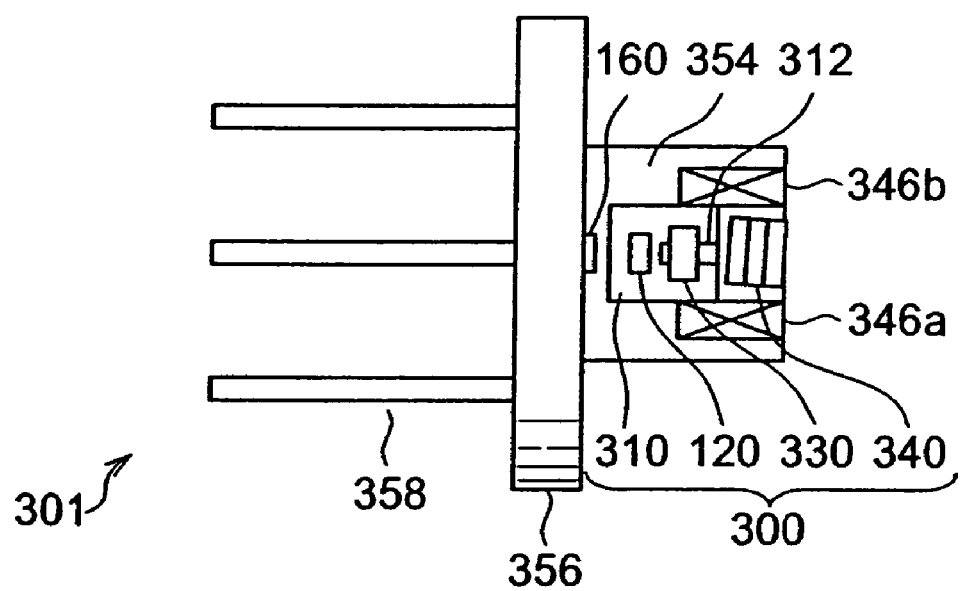
FIG. 6 is a plan view of the structure adopted in an optical module in the third embodiment of the present invention.
Figure 7A:
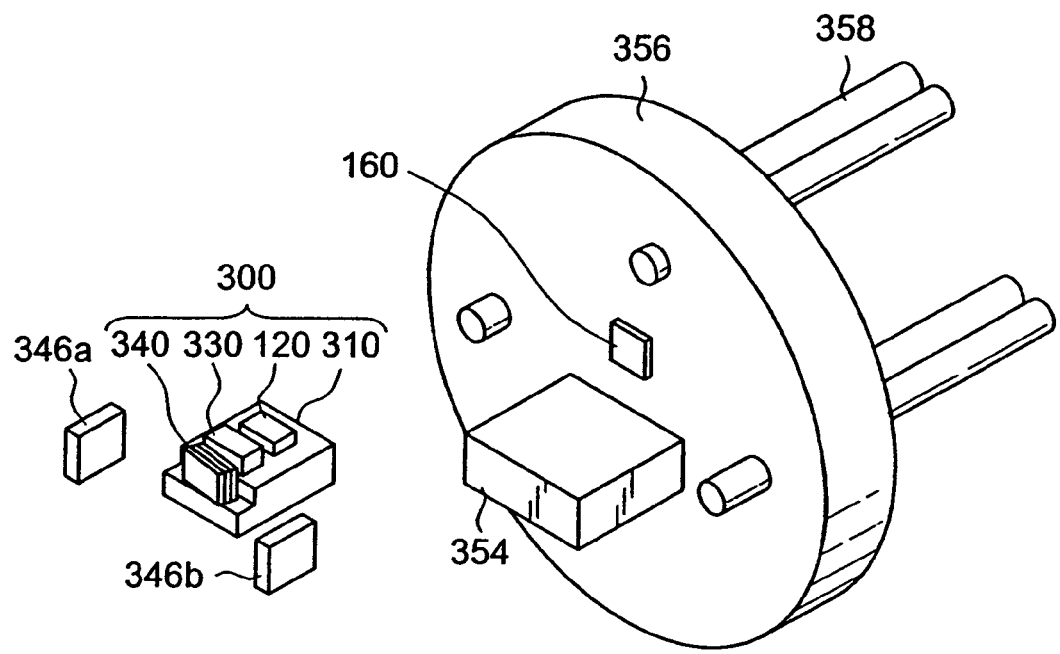
FIG. 7A is an exploded perspective showing the structure adopted in the optical module in the third embodiment of the present invention.
Figure 7B:
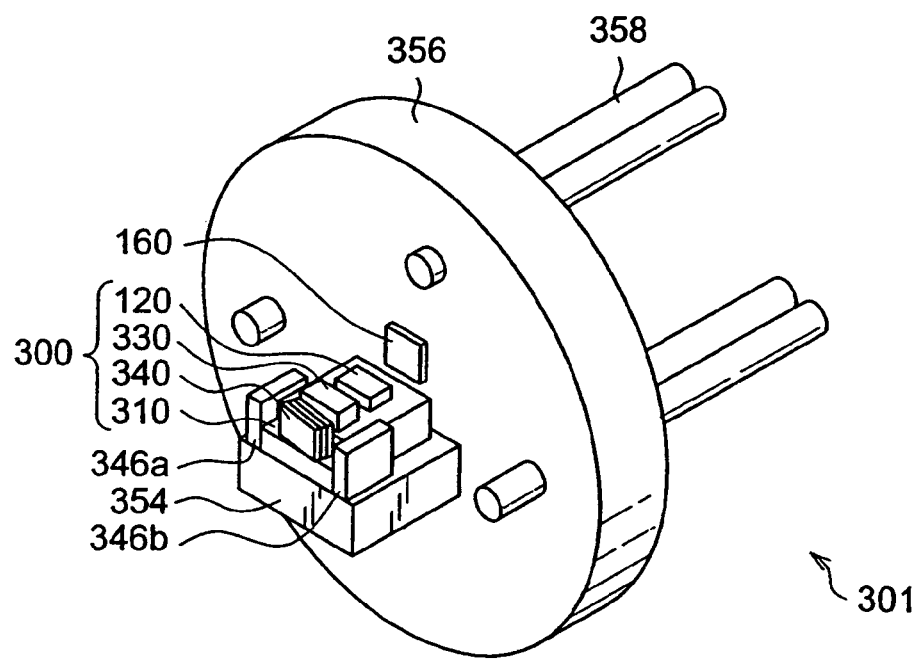
FIG. 7B is a perspective showing the structure adopted in the optical module in the third embodiment of the present invention.

Next, an optical module constituted by using the subassembly 300 is explained. FIG. 6 is a plan view showing the structure of an optical module 301 constituted by using the subassembly 300. FIG. 7A is an exploded perspective of the optical module 301 and FIG. 7B is a perspective of the optical module 301. It is to be noted that in FIGS. 6, 7A and 7B, details such as the grooves which are formed at the lens element 330 are not included in the illustrations.

The optical module 301 includes the subassembly 300, two magnets 346a and 346b, a package component and a photodiode 160. The package component used in conjunction with the optical module 301 is a coaxial package component which includes a header 354 constituting a pedestal upon which the subassembly 300 is placed, a stem 356 assuming a substantially disk shape, and electrode terminals 358. The header 354 is fixed onto one surface of the stem 356. The electrode terminals 358, which pass through the stem 356 and are fixed, extend to the other surface of the stem 356. It is to be noted that other than FIGS. 7A and 7B, the drawings do not include an illustration of the electrode terminals 358 extending to the other surface.

The subassembly 300 and the magnets 346a and 346b are positioned and fixed onto the header 354. The magnets 346a and 346b constitute a means for magnetic field application that applies a magnetic field to the Faraday rotator 344 of the isolator element 340 and are disposed on the two sides of the isolator element 340.

The photodiode 160 is a light receiving element and is fixed onto the surface of the stem 356 at a position above the header 354 so as to monitor the light originating from the rear end surface of the laser diode 120. It is to be noted that the laser diode 120 and the photodiode 160 are each electrically connected with an electrode terminal 358.

As described above, in the optical module 301, the supporting substrate 310 having the laser diode 120, the lens element 330 and the isolator element 340 mounted thereupon and the magnets 346a and 346b are disposed on the header 354 in an extremely compact configuration.

Figure 8:
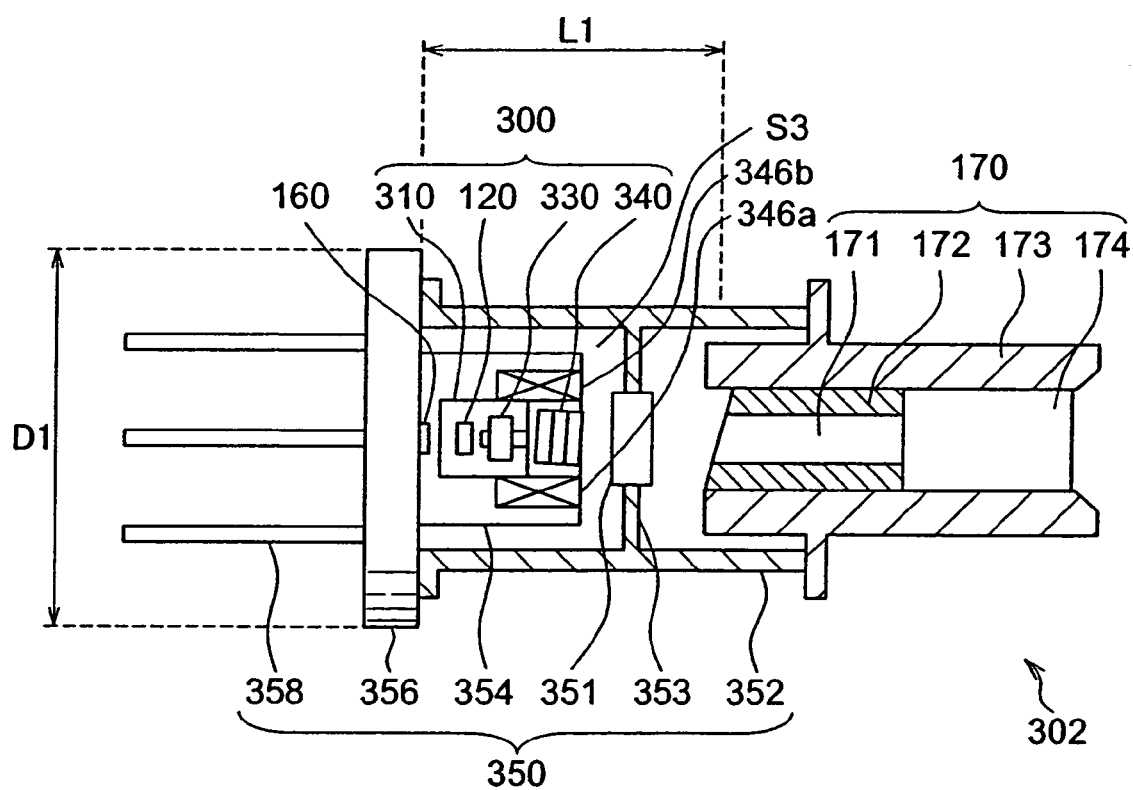
FIG. 8 is a partial sectional view showing the structure adopted in an optical module in the third embodiment of the present invention.

FIG. 8 is a partial sectional view showing the structure of an optical module 302 constituted by using the subassembly 300. A cap 352 and an interface 170 are shown in sectional form. It is to be noted that FIG. 8 does not include an illustration of the groove 337 at the lens element 330. The optical module 302 adopts a structure achieved by adding the substantially cylindrical cap 352 and the interface 170 to the structure of the optical module 301. The interface 170 is identical to that in the first embodiment. Some of the structural features identical to those having been referred to earlier are not explained.

The cap 352 is a coaxial package part constituted of a metal such as iron. One end of the cap 352 is fixed to the stem 356, whereas the interface 170 is fixed to the other end of the cap 352. A barrier wall 353 is formed inside the cap 352, with a flat window 351 mounted over a portion of the barrier wall 353. The flat window 351 is constituted of a material that allows the light emitted from the laser diode 120 to be transmitted. A sealed space S3 formed by the stem 356, the cap 352, the barrier wall 353 and the flat window 351 is maintained in an airtight state. The subassembly 300 is held inside the airtight space S3. The front end of the interface 170 is inserted in the space on the other side of the barrier wall 353 and the flat window 351 opposite from the side where the airtight space S3 is located. The length of the cap 352 along the optical axis is set in advance during the design stage so that when the large diameter portion of the interface 170 and the end of the cap 352 are abutted to each other, the point at which light is condensed through the lens element 330 is positioned at the end surface of the optical fiber 171, as in the first embodiment.

The divergent light emitted from the laser diode 120 is converted to convergent light at the lens element 330, is transmitted through the isolator 340, travels through the flat window 351 and then enters the optical fiber 171 so that the light is condensed at a point at the end surface of the optical fiber 171. Thus, the laser diode 120 is optically coupled with the optical fiber 171 via the lens element 330.

The following is an explanation of an example of a manufacturing method that may be adopted to manufacture the subassembly 300 and the optical module 301 and 302. First, the supporting substrate 310 having the V-shaped groove 312 and the stage formed thereat is prepared, the laser diode 120 is set at the upper level surface 314 by positioning the laser diode 120 with a high degree of accuracy from above the supporting substrate 110 with a marker (not shown), and then the laser diode 120 is bonded onto the supporting substrate 110 with solder or the like. Next, after identifying the lens formation surface of the lens element 330 by using the grooves 337, the lens element 330 is disposed with the projection portion 336 in contact with the V-shaped groove 312. With this, the lens element 330 is positioned along the direction that is perpendicular to the upper level surface 314. The position of the lens element 330 along the optical axis is set by using the positioning grooves 338a and 338b and a marker (not shown) provided in advance at the supporting substrate 310. The lens element 330 can be set by holding its upper surface or side surface which is flat with an appropriate means for holding. Once it is verified that the lens element 330 is set at the correct position, the lens element 330 is bonded onto the V-shaped groove 312. The adhesive that may be used to bond the lens element 330 may be a thermosetting resin, a UV (ultraviolet)-setting resin or solder. Next, the isolator element 340 is positioned at the lower level surface 316 and then is bonded at the specific position by using a resin or the like. Through the processing described above, the subassembly 330 is manufactured.

The optical module 302 can then be manufactured by setting the subassembly 300 at the header 354 and bonding the subassembly 300 onto the header 354 with a thermosetting resin, solder or the like. After the subassembly 300 is bonded onto the header 354, the magnets 346a and 346b are set and fixed onto the header 354. Then, the wiring of the laser diode 120 is electrically connected through wire bonding. Through the steps described above, the optical module 301 is manufactured.

Then, the cap 352 is mounted and one end of the cap 352 is fixed to the stem 356 through welding. In this state, the subassembly 300, which is packaged by using the package parts constituting the package 350, is held in the airtight space S3. Next, the interface 170 is inserted through the other end of the cap 352, the large diameter portion of the interface 170 and the end of the cap 352 are abutted against each other, alignment is performed as in the first embodiment, and the interface 170 is fixed. Through the steps described above, the optical module 302 is manufactured.

A compact isolator element used in the related art has to be disposed near the end of the optical fiber where the light flux diameter is small. In addition, while the polarizers and the Faraday rotator can be miniaturized to a certain extent in an optical module having an isolator adopting the structure in the related art, the presence of the magnets disposed around the isolator hinders further miniaturization.

However, since the lens element is disposed in close proximity to the laser diode, the light flux diameter is reduced in the third embodiment. For this reason, the isolator element can be mounted on the package header, and furthermore, the magnets can also be mounted at the header 354 in the third embodiment. Thus, a highly compact structure is realized by disposing numerous parts on the header 354 in the third embodiment. The length of the subassembly 300 along the optical axis is less than approximately 1 mm. Accordingly, an extremely small distance L1 of approximately 1 mm is achieved between the surface of the stem 356 and the end of the optical fiber 171. Furthermore, the external diameter D1 of the stem 356 does not exceed approximately 3 mm.

As described above, the third embodiment provides, as does the first embodiment, a highly compact optical module that facilitates high precision positioning and does not require any complicated alignment process. In addition, since the third embodiment allows the use of a small isolator element and does not require a member which holds the lens such as a cap, a cost reduction is achieved. The results of a measurement executed on the optical module 302 manufactured as described above confirm that light is output from the optical fiber 171 with a 50% coupling efficiency.

Fourth Embodiment

Figure 9:
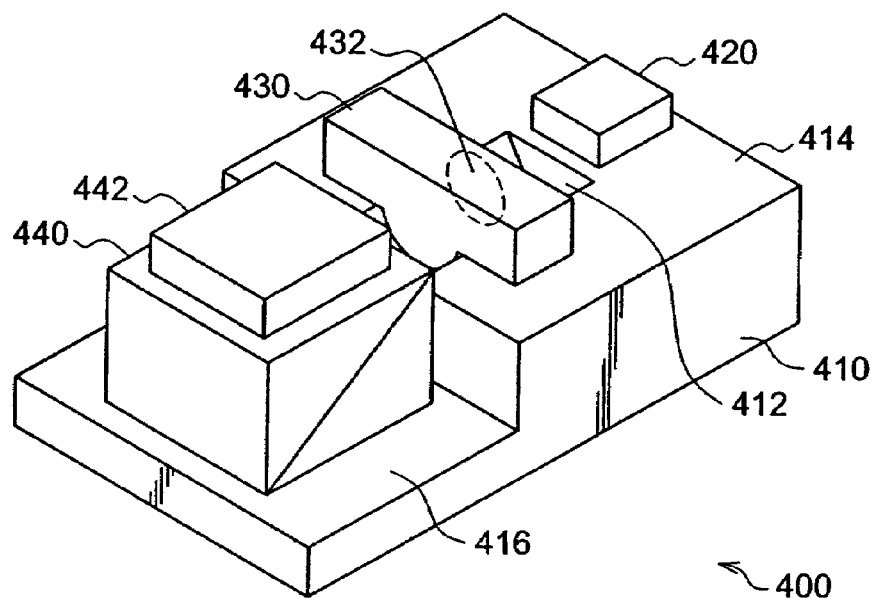
FIG. 9 is a perspective showing the structure of the subassembly achieved in a fourth embodiment of the present invention.
Figure 10:
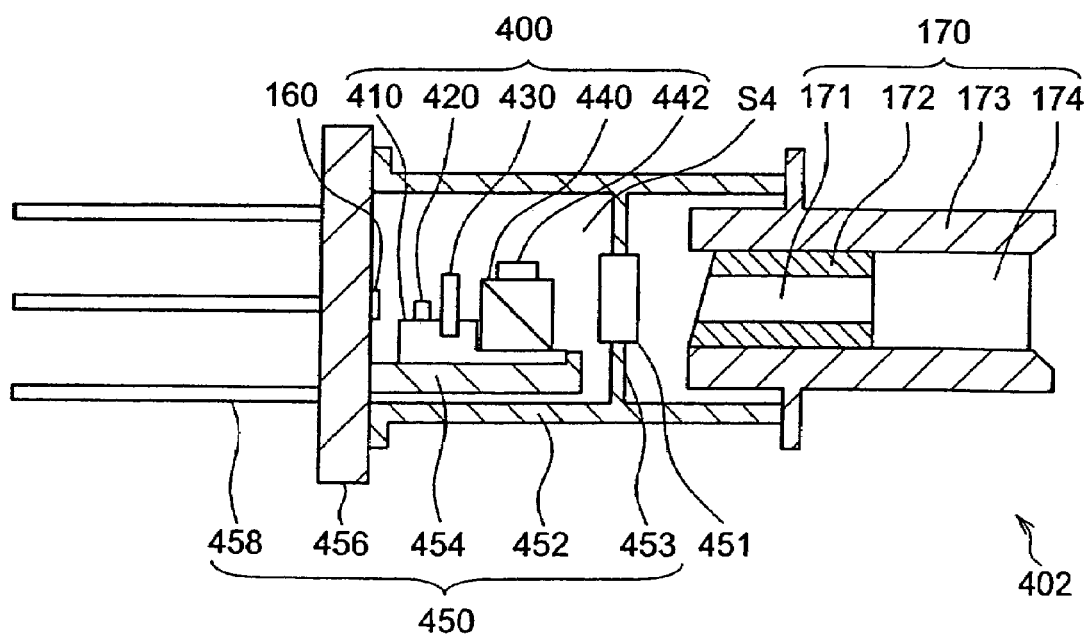
FIG. 10 is a sectional view of the structure adopted in the optical module in the fourth embodiment of the present invention.

Next, the subassembly and the optical module achieved in the fourth embodiment of the present invention are explained with reference to FIGS. 9 and 10. FIG. 9 is a perspective of a subassembly 400 achieved in the fourth embodiment of the present invention. FIG. 10 is a sectional view of an optical module 402 achieved in the fourth embodiment of the present invention by using the subassembly 400. The fourth embodiment is characterized by the optical module 402 being constituted as a single fiber bidirectional optical module that bidirectionally propagates two types of light signals with different wavelengths through a single optical fiber. The following explanation focuses on this feature, and some of the structural features which are identical to those in the first embodiment are not explained repeatedly.

The subassembly 400 includes a supporting substrate 410, a laser diode 420, a lens element 430, a wavelength dividing filter 440 and a photodiode 442. The laser diode 420, the lens element 430 and the wavelength dividing filter 440 are mounted in this order on the supporting substrate 410 over specific intervals.

The supporting substrate 410 may be constituted of, for instance, a silicon crystal substrate. The supporting substrate 410 adopts a two-level structure which includes a stage and has a V-shaped groove 412 at which a member is to be disposed and formed thereat, as does the supporting substrate 310 shown in FIG. 5B. In the following explanation, the upper surface of the upper level portion of the supporting substrate 410 is referred to as an upper level surface 414, whereas the upper surface of the lower level portion of the supporting substrate 410 is referred to as a lower level surface 416. The V-shaped groove 412 is formed to extend from one end of the upper level surface 414 located on the staged side to a middle point.

The laser diode 420 is a light emitting element that emits light with a wavelength $\lambda1$ for transmission. The laser diode 420 is disposed at a position where the V-shaped groove 412 is not present, on a line extending from the V-shaped groove 412 on the upper level surface 414.

The lens element 430 is disposed at the V-shaped groove 412. The lens element 430 is constituted of an optical substrate which may be a quartz substrate or a silicon substrate. As does the lens element 130 in the first embodiment, the lens element 430 includes a lens portion 432 constituted of a diffractive optical element which is formed at one surface of the optical substrate, a projection portion having a contour that allows the projection portion to come into contact with the V-shaped groove 412 when the lens element 430 is mounted and a handling portion that allows the lens element to be held with ease for handling. The optical performance of the lens portion 432 differs from that of the lens portion 132 of the lens element 130. Other structural features and a manufacturing method that may be adopted to manufacture the lens element 130 are substantially similar to those of the lens element 430.

The wavelength dividing filter 440 is disposed at the lower level surface 416. The wavelength dividing filter 440, which achieves wavelength selectivity, has a function of dividing light into different wavelengths. For instance, if two types of light with different wavelengths $\lambda1$ and $\lambda2$ enter the wavelength dividing filter 440, the light with the wavelength $\lambda1$ is transmitted and the light with the wavelength $\lambda2$ is reflected. The wavelength dividing filter 440 may be constituted by using, for instance, a multilayer film mirror. In this example, the wavelength dividing filter 440 adopts a structure which is achieved by enclosing a dielectric multilayer film with two glass blocks. The dielectric multilayer film has a function of allowing the light with the wavelength $\lambda1$ to be transmitted and reflecting the light with the wavelength $\lambda2$. The wavelength dividing filter 440 is set so that the dielectric multilayer film intersects the optical axis of the light emitted from the laser diode 420 with a 45° angle.

At the upper surface of the wavelength dividing filter 440, a photodiode 442 which receives light is set and fixed with solder. The photodiode 442, which is constituted of a plane entry-type light receiving element, is directly mounted at the wavelength dividing filter 440 so that the light receiving portion of the photodiode 442 and the wavelength dividing filter 440 face opposite each other with no lens or spacer present between them in this example.

At the subassembly 400, the laser diode 420 and the lens element 430 are positioned and set so that the laser diode 420 and the lens portion 432 of the lens element 430 share the same optical axis. The lens element 430 is positioned along the two directions that are perpendicular to the optical axis with ease by placing the lens element with the projection portion of the lens element 430 in contact with the V-shaped groove 412.

Next, an optical module 402 constituted by using the subassembly 400 is explained with reference to FIG. 10. The optical module 402 includes the subassembly 400, a lens element 451, a package 450 and an interface 170. The lens element 451 is constituted of a diffractive optical element formed at a surface of an optical substrate in this embodiment. However, the lens element 451 may be constituted of a ball lens or an aspherical lens instead of a diffractive optical element. As shown in FIG. 10, the subassembly 400 is packaged by using package parts (components) constituting the package 450, and the interface 170 is fixed in contact with the package 450.

The package 450 is a coaxial package that includes a cap 452 having a substantially cylindrical external shape, a header 454 constituting a pedestal portion, a stem 456 having a substantially disk shape, and electrode terminals 458. One end of the header 454 is fixed onto one surface of the stem 456, whereas a stage against which the subassembly 400 is to be abutted is formed at the other end of the header 454. It is to be noted that this contact stage is not a crucial structural feature and the header 454 may instead adopt a structure that does not include any stage. The subassembly 400 is fixed onto the header 454. A photodiode 160, which is a light receiving element, is fixed on the surface of the stem 456 located toward the header 454. The photodiode 160 is used to monitor the light traveling from the rear end surface of the laser diode 420. The laser diode 420 and the photodiodes 160 and 442 are each electrically connected with an electrode terminal 458.

The cap 452 is constituted of a metal such as iron. One end of the cap 452 is fixed to the stem 456, whereas the interface 170 is fixed to the other end. A barrier wall 453 is formed inside the cap 452, with the lens element 451 mounted over a portion of the barrier wall 453. A sealed space S4 formed by the stem 456, the cap 452, the barrier wall 453 and the lens element 451 is maintained in an airtight state. The subassembly 400 is held inside the airtight space S4. The front end of the interface 170 is inserted in the space on the other side of the barrier wall 453 and the lens element 451, opposite from the side where the airtight space S4 is located. The length of the cap 452 along the optical axis is set in advance during the design stage so that when the large diameter portion of the interface 170 and the end of the cap 452 are abutted to each other, the point at which light is condensed through the lens element 451 is positioned at the end surface of the optical fiber 171.

The operation of the optical module 402 adopting the structure as described above will now be explained. The divergent light with the wavelength $\lambda1$ emitted from the laser diode 420 is converted to substantially parallel light at the lens element 430 and is then transmitted through the wavelength dividing filter 440. Subsequently, the light is converted to convergent light at the lens element 451, is condensed toward the end surface of the optical fiber 171 and is transmitted to the outside from the optical fiber 171. In addition, the light signal with the wavelength $\lambda2$ input from the outside to the optical module 402 is propagated through the optical fiber 171 and is emitted as divergent light from the diagonal end portion of the optical fiber 171 toward the lens element 451. This emitted light is converted to substantially parallel light at the lens element 451 and enters the wavelength dividing filter 440. Then, the light is reflected from the dielectric multilayer film constituting the wavelength dividing filter 440 so as to advance along a direction that is perpendicular to the upper surface of the supporting substrate 410 and enters the photodiode 442. Since the light entering the photodiode 442 is substantially parallel light, the photodiode 442 can be positioned with ease. As described above, the optical module 402 functions as a bidirectional transmission/reception module.

As explained above, the fourth embodiment achieves an advantage in that a single fiber bidirectional optical module, in which two types of light signals with different wavelengths are propagated bidirectionally through a single optical fiber, is provided in a compact configuration, in addition to the advantages of the first embodiment.

It is to be noted that while an explanation is given above in reference to the fourth embodiment on an example in which the light traveling between the lens element 430 and the lens element 451 is a substantially parallel light beam, the present invention is not limited to this example. The light beam diameter may change, e.g., the light beam diameter may gradually increase, while traveling between the lens element 430 and the lens element 451. Alternatively, instead of the lens element 430 and the lens element 451, the lens element 130 and the flat window 151 respectively may be disposed to allow non-parallel light to be transmitted through the wavelength dividing filter 440.

Fifth Embodiment

Figure 11:
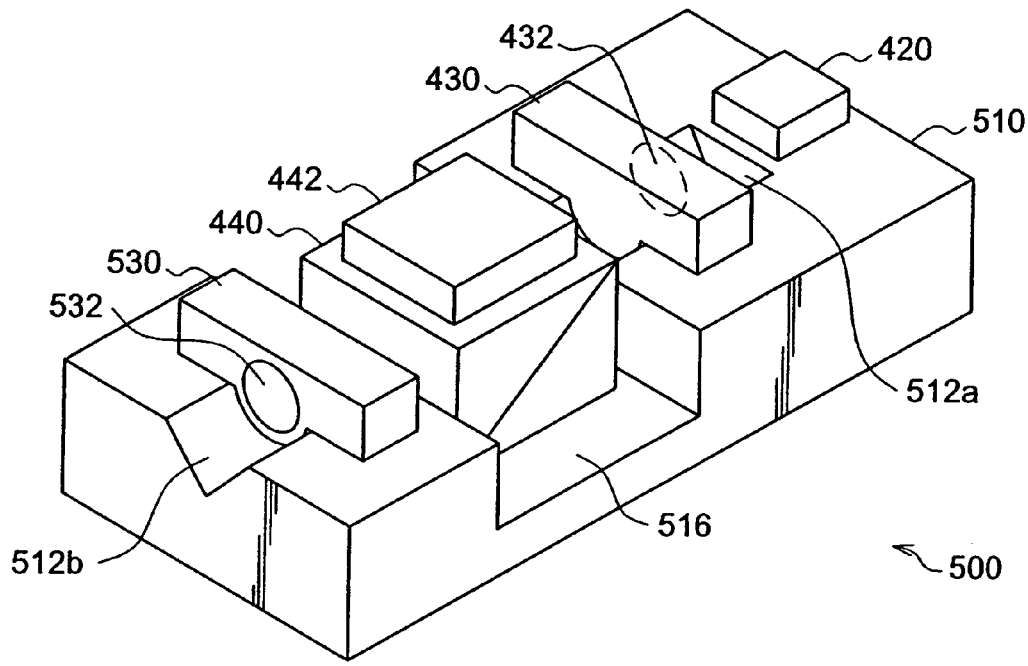
FIG. 11 is a perspective showing the structure of the subassembly achieved in a fifth embodiment of the present invention.
Figure 12:
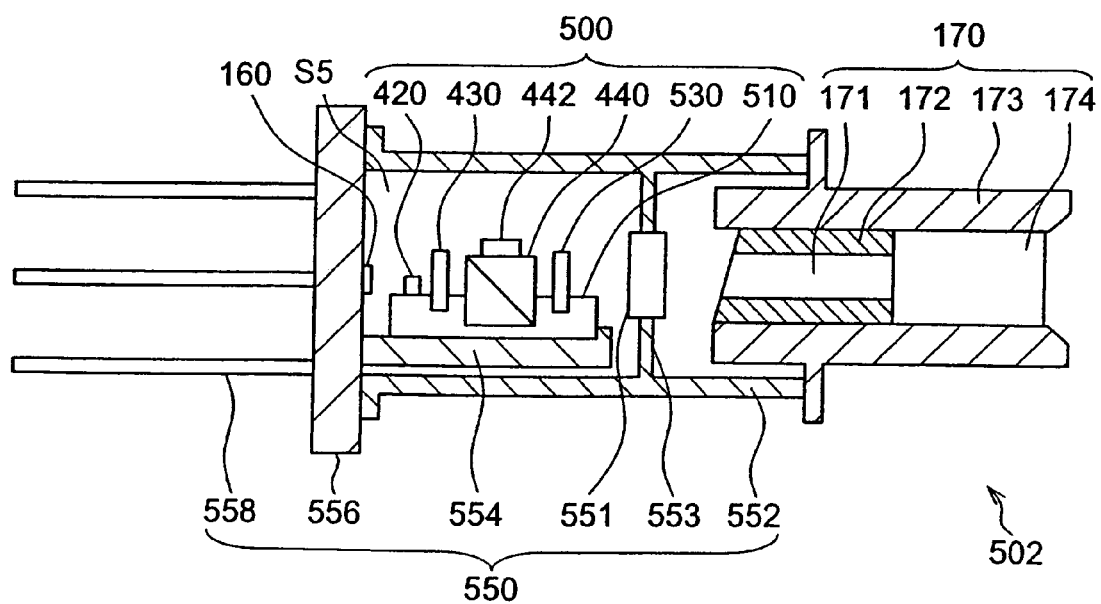
FIG. 12 is a sectional view of the structure adopted in the optical module in the fifth embodiment of the present invention.

Next, the optical module achieved in the fifth embodiment of the present invention is explained with reference to FIGS. 11 and 12. FIG. 11 is a perspective of a subassembly 500 achieved in the fifth embodiment of the present invention. FIG. 12 is a sectional view of an optical module 502 achieved in the fifth embodiment of the present invention by using the subassembly 500. The structure adopted in the optical module in the fifth embodiment is achieved basically by replacing the lens element 451 with a flat window and adding a second lens element in the subassembly 400 in the optical module 402 in the fourth embodiment. The following explanation focuses on these structural features, and some of the structural features which are similar to those of the fourth embodiment are not explained again.

The subassembly 500 includes a supporting substrate 510, a laser diode 420, two lens elements 430 and 530, a wavelength dividing filter 440 and a photodiode 442. The supporting substrate 510 may be constituted of, for instance, a silicon crystal substrate. Two V-shaped grooves 512a and 512b and an indented groove 516 are formed at the upper surface of the supporting substrate 510. These grooves are formed so that the two V-shaped grooves 512a and 512b run on a single straight line communicating with the indented groove 516 located between them. The V-shaped groove 512a is formed to extend to a middle point of the supporting substrate 510 from the indented grooves 516, whereas the V-shaped groove 512b is formed to extend from the indented grooves 516 to one end of the supporting substrate 510.

The V-shaped grooves 512a and 512b both have a section with a V shape. The V-shaped grooves 512a and 512b may be formed so as to allow a single mode optical fiber with a diameter of 125 μm to be placed therein. The V-shaped grooves 512a and 512b can be formed through, for instance, anisotropic etching. The indented groove 516, at which the wavelength dividing filter 440 is disposed, has a flat area at its bottom surface. While the section of the indented groove 516 is substantially rectangular in this example, the present invention is not limited to this example. The indented groove 516 can be formed through dicing or the like.

The laser diode 420 is a light emitting element that emits light with a wavelength λ1 for transmission. The laser diode 420 is disposed on the supporting substrate 510 at a position where the V-shaped groove 512a is not present, on a line extending from the V-shaped groove 512a.

The lens element 430 is set at the V-shaped groove 512a located closer to the laser diode 420, whereas the lens element 530 is disposed at the V-shaped groove 512b located further away from the laser diode 420. The lens elements 430 and 530 are each constituted of an optical substrate such as a quartz substrate or a silicon substrate and respectively include lens portions 432 and 532, each constituted of a diffractive optical element formed at one surface of the optical substrate. The lens portions 432 converts the light emitted from the laser diode 420 to substantially parallel light, whereas the lens portions 532 converts the substantially parallel light to convergent light. The lens elements 430 and 530 differ from each other only in the optical performance of the respective lens portions 432 and 532, and their other structural features such as their shapes are identical. As does the lens element 130 in the first embodiment, the lens elements 430 and 530 include projection portions having a shape that allows the projection portions to come into contact with the V-shaped grooves 512a and 512b when the lens elements are mounted, and handling portions that are used to hold the lens elements for easy handling. It is to be noted that while the shape of the front ends of the handling portions of the lens elements 430 and 530 is slightly different from that of the front end of the handling portion of the lens element 130, this difference does not affect the mounting process.

The wavelength dividing filter 440 is disposed at the indented groove 516. At the upper surface of the wavelength dividing filter 440, a photodiode 442, which receives light, is set and fixed with solder.

At the subassembly 500, the laser diode 420 and the lens elements 430 and 530 are positioned and set so that the laser diode 420 and the lens portions 432 and 532 of the lens elements 430 and 530 share a common optical axis. The lens elements 430 and 530 can be positioned along the two directions that are perpendicular to the optical axis simply by placing the projection portions of the individual lens elements in contact with the V-shaped grooves 512a and 512b, respectively.

Next, the optical module 502 achieved by using the subassembly 500 is explained with reference to FIG. 12. The optical module 502 includes the subassembly 500, a package 550 and an interface 170. The package 550 is a coaxial package that includes a cap 552 having a substantially cylindrical external shape, a header 554 constituting a pedestal portion, a stem 556 having a substantially disk shape, and electrode terminals 558. One end of the header 554 is fixed onto one surface of the stem 556, whereas a stage against which the subassembly 500 is to be abutted is formed at the other end of the header 554. It is to be noted that this contact stage is not a crucial structural feature and the header 554 may instead adopt a structure that does not include any stage. The subassembly 500 is fixed onto the header 554. A photodiode 160, which is a light receiving element, is fixed on the surface of the stem 556 located toward the header 554. The photodiode 160 is used to monitor the light traveling from the rear end surface of the laser diode 420. The laser diode 420 and the photodiodes 160 and 442 are each electrically connected with an electrode terminal 558.

The cap 552 is constituted of a metal such as iron. One end of the cap 552 is fixed to the stem 556, whereas the interface 170 is fixed to the other end. A barrier wall 553 is formed inside the cap 552, with a flat window 551 mounted over a portion of the barrier wall 553. The flat window 551 is constituted of a material that allows the light emitted from the laser diode 420 and the light emitted from the optical fiber 171 to be transmitted. A sealed space S5 formed by the stem 556, the cap 552, the barrier wall 553 and the flat window 551 is maintained in an airtight state. The subassembly 500, which is packaged by using the package parts (components) constituting the package 550, is held inside the airtight space S5. The front end of the interface 170 is inserted in the space on the other side of the barrier wall 553 and the flat window 551 opposite from the side where the airtight space S5 is located. The length of the cap 552 along the optical axis is set in advance during the design stage so that when the large diameter portion of the interface 170 and the end of the cap 552 are abutted to each other, the point at which light is condensed through the lens element 530 is positioned at the end surface of the optical fiber 171.

The operation of the optical module 502 adopting the structure as described above is explained. The divergent light with the wavelength λ1 emitted from the laser diode 420 is converted to substantially parallel light at the lens element 430 and is then transmitted through the wavelength dividing filter 440. Subsequently, the light is converted to convergent light at the lens element 530, is condensed toward the end surface of the optical fiber 171 and is transmitted to the outside from the optical fiber 171. In addition, the light signal with the wavelength λ2 input from the outside to the optical module 402 is propagated through the optical fiber 171 and is emitted as divergent light from the diagonal end portion of the optical fiber 171 toward the lens element 530. This emitted light is converted to substantially parallel light at the lens element 530 and enters the wavelength dividing filter 440. Then, the light is reflected from the dielectric multilayer film constituting the wavelength dividing filter 440 so as to advance along a direction that is perpendicular to the upper surface of the supporting substrate 510 and enters the photodiode 442. As described above, the optical module 502 functions as a bidirectional transmission/reception module.

As explained above, the optical module in the fifth embodiment achieves functions and advantages similar to those of the optical module in the fourth embodiment. In addition, since the two lens elements are both included in the subassembly, the lens elements can be positioned and mounted with greater ease in the embodiment.

Figure 13:
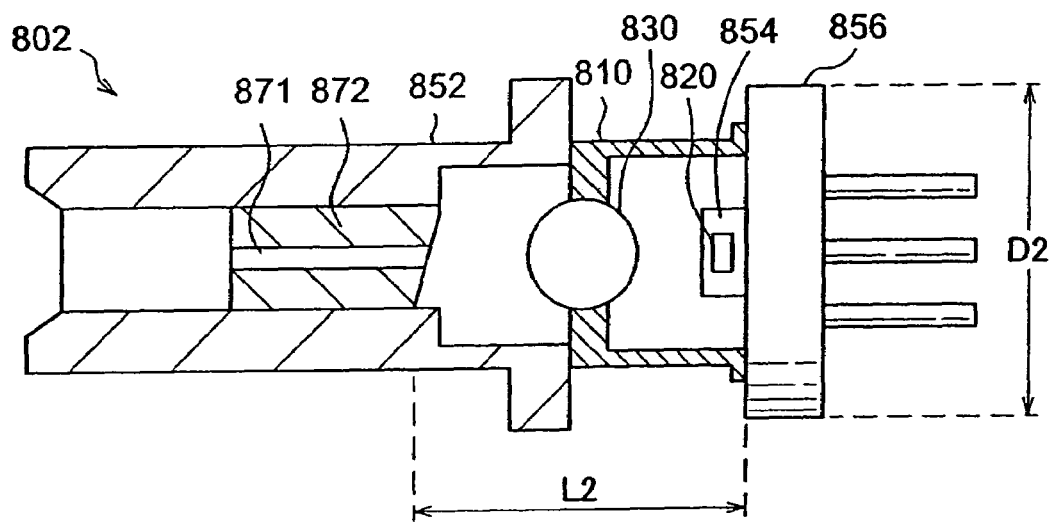
FIG. 13 is a partial sectional view showing the structure of an optical module in the related art.
Figure 14:
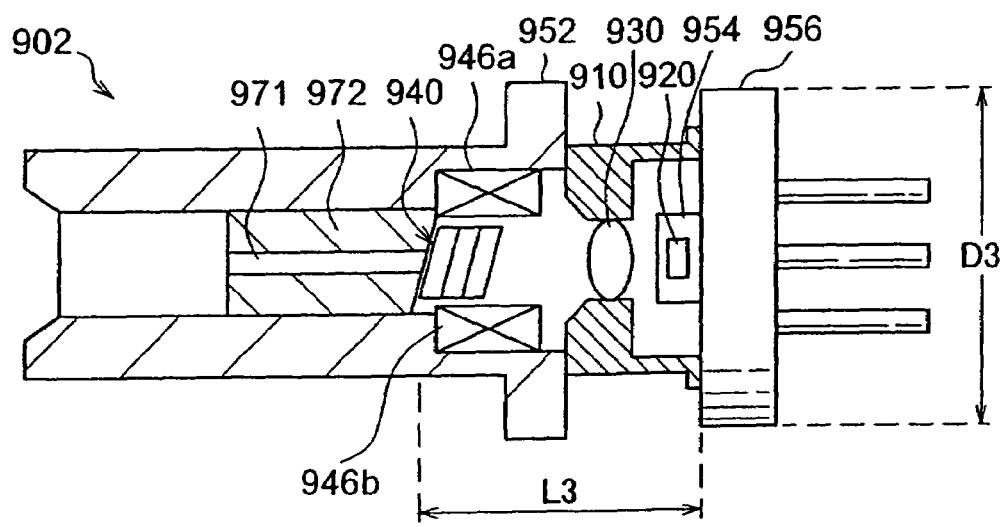
FIG. 14 is a partial sectional view showing the structure of an optical module in the related art.

FIGS. 13 and 14 show optical modules in the related art, presented as examples for comparison. FIG. 13 is a partial sectional view of an optical module 802 in the related art, in which a laser diode and an optical fiber are optically coupled via a ball lens. FIG. 14 is a partial sectional view of an optical module 902 in the related art that includes an isolator.

The optical module 802 shown in FIG. 13, which does not include an isolator, couples a laser diode 820 and an optical fiber 871 by using a ball lens 830 having a large diameter. In the optical module 802, the laser diode 820 is mounted on a header 854 which, in turn, is fixed onto a surface of a stem 856. A cap 810 used to hold the ball lens 830 is disposed around the laser diode 820 so as to enclose the header 854. One end of a cylindrical portion 852 constituting a cylindrical package member is bonded to the cap 810. The optical fiber 871 and a ferrule 872 are inserted and fixed in the cylindrical portion 852.

As FIG. 13 illustrates, the distance between laser diode 820 and the ball lens 830 is significant in the optical module 802 which utilizes a large diameter ball lens 830. In addition, the cap 810 holding the ball lens 830 is also bound to be large, and for these reasons, the optical module 802 cannot be provided as a compact unit. The distance L2 from the surface of the stem 856 to the end of the optical fiber 871 is at least 5 mm and the external diameter D2 of the stem 856 is approximately 5 mm in the optical module 802.

An optical module 902 shown in FIG. 14 adopts a structure achieved by disposing an isolator 940 on a side near an end of an optical fiber 971 with magnets 946a and 946b set on the two sides of the isolator 940. In the optical module 902, a laser diode 920 is located on a header 954 fixed onto one surface of a stem 956. A cap 910 used to hold a lens 930 is provided around the laser diode 920 so as to enclose the header 954. One end of a cylindrical portion 952 constituting a cylindrical package member is bonded to the cap 910. The optical fiber 971 and a ferrule 972 are inserted and fixed in the cylindrical portion 952.

As FIG. 14 clearly indicates, the optical module 902 includes the lens 930 which is larger than the lens element 330 used in the third embodiment of the present invention with the cap 910 disposed around the lens 930. For this reason, the distance between the laser diode 920 and the optical fiber 971 is much greater than that in the optical module 302 in the third embodiment of the present invention. In the optical module 902, the distance L3 from the surface of the stem 956 to the end of optical fiber 971 is approximately 5 mm and the external diameter D3 of the stem 956 is approximately 5 mm.

While the present invention has been particularly shown and described with respect to preferred embodiments thereof by referring to the attached drawings, the present invention is not limited to these examples, and it will be understood by those skilled in the art that various changes in form and detail may be made therein without departing from the spirit, scope and teaching of the invention.

While an explanation is given in reference to the first through fifth embodiments on examples in which the present invention is adopted in an optical module achieved by using a coaxial package, the present invention is not limited to this application and it may instead be adopted in conjunction with a flat package that is substantially rectangular parallelepiped in shape. In addition, a lens element, a lens portion, a handling portion, a projection portion and the like taking on shapes other than those in the examples above may be used. While the lens portion is formed at one surface of an optical substrate in the examples explained above, a lens portion may instead be formed at each of the two surfaces of an optical substrate. Furthermore, the lens portion may be formed at a surface other than the surface at which the lens portion is formed in the examples explained above. Moreover, the quantity of lens elements included in the subassembly is not limited to those in the examples explained above. A lens element may be formed by using an optical substrate constituted of any of GaAs, InP, GaP, SiC, Ge and the like as well as the materials mentioned earlier. While the supporting substrate is a silicon crystal substrate in the embodiments explained above, the supporting substrate may instead be a ceramic substrate, an aluminum nitride substrate, an alumina substrate, a silicon carbide substrate or the like. The shape of the section of the groove formed at the supporting substrate to dispose a lens element is not limited to that adopted in the examples, and instead, the groove may be formed to have a section that is substantially V-shaped, substantially trapezoidal, substantially semicircular or substantially rectangular.

While the optical fiber and the laser diode are coupled in the first through third embodiments, a light receiving element such as a photodiode may be utilized in place of the laser diode.

The axial shift-type lens element achieved in the second embodiment may also be used in the third through fifth embodiments.

In the fourth and fifth embodiments, elements having other optical functions, e.g., an isolator, a deflector, a wave plate and a filter, may be used instead of the wavelength dividing filter 440 and the photodiode 442. In addition, depending upon the specific structure of the wavelength dividing filter that is used, the photodiode 442 may be disposed at a side of the wavelength dividing filter instead of on the wavelength dividing filter.

What is claimed is:

1. A subassembly comprising:
   a supporting substrate having a groove at which a member is disposed;
   a light emitting element mounted at said supporting substrate and operable to emit light with a first wavelength;
   a lens element including a lens portion formed at a surface of an optical substrate and a projection portion that comes in contact with said groove at said supporting substrate when said lens element is mounted, said lens element being positioned relative to said light emitting element and being operable to convert divergent light emitted from said light emitting element to substantially parallel light, and said projection portion supporting an external edge of said lens portion and being disposed between said groove and the external edge of said lens portion when said lens element is mounted;
   a wavelength dividing filter mounted at said supporting substrate and operable to divide light into different wavelengths; and
   a light receiving element at which light with a second wavelength having been divided through said wavelength dividing filter enters.

2. A subassembly according to claim 1, wherein said lens portion is constituted of a diffractive optical element.

3. A subassembly according to claim 1, wherein said optical substrate is a silicon crystal substrate.

4. A subassembly according to claim 1, wherein said lens element is not a ball lens.

5. A subassembly according to claim 1, wherein said lens element includes a rectangular handling portion extending in a direction orthogonal to a direction in which said groove extends.

6. A subassembly according to claim 1, wherein said lens portion of said lens element is operable to cause a light flux to exit therefrom in a direction which is different from the direction of an incident light flux emitted from said light emitting element.

7. A subassembly according to claim 1, wherein said projection portion is operable to be placed in contact with said groove so as to align an optical axis of said lens portion with an optical axis of said light emitting element.

8. An optical module comprising:
   a supporting substrate having a groove at which a member is disposed;
   a light emitting element mounted at said supporting substrate and operable to emit light with a first wavelength;
   a first lens element including a lens portion formed at a surface of an optical substrate and a projection portion that comes in contact with said groove when said first lens element is mounted, said first lens element being positioned relative to said light emitting element and being operable to convert divergent light emitted from said light emitting element to substantially parallel light, and said projection portion supporting an external edge of said lens portion and being disposed between said groove and the external edge of said lens portion when said lens element is mounted;
   a wavelength dividing filter disposed at said supporting substrate and operable to divide light into different wavelengths;
   a light receiving element at which light with a second wavelength having been divided through said wavelength dividing filter enters;
   one or more package components used to package said supporting substrate having said light emitting element, said first lens element, and said wavelength dividing filter mounted thereat and said light receiving element;
   a second lens element operable to convert the substantially parallel light to convergent light; and
   an interface including an optical fiber at which the light with the first wavelength having been converted to convergent light enters and the light with the second wavelength exits toward said second lens element, said interface being positioned as said interface comes in contact with said package component.

9. An optical module according to claim 8, wherein said one or more package components and said second lens element form an airtight space, and said supporting substrate and said light receiving element are held in the airtight space.

10. An optical module according to claim 8, wherein said one or more package components are coaxial package components.

11. An optical module according to claim 8, wherein said first lens element is not a ball lens.

12. An optical module according to claim 8, wherein said first lens element includes a rectangular handling portion extending in a direction orthogonal to a direction in which said groove extends.

13. An optical module according to claim 8, wherein said lens portion of said first lens element is operable to cause a light flux to exit therefrom in a direction which is different from the direction of an incident light flux emitted from said light emitting element.

14. An optical module according to claim 8, wherein said projection portion is operable to be placed in contact with said groove so as to align an optical axis of said lens portion with an optical axis of said light emitting element.

15. A subassembly comprising:
   a supporting substrate having a first groove and a second groove both adopting a first structure and a third groove adopting a second structure, said third groove being positioned between said first groove and said second groove adopting the first structure;
   a light emitting element mounted at said supporting substrate and operable to emit light with a first wavelength;
   a first lens element including a first lens portion formed at a surface of an optical substrate and a first projection portion that comes in contact with said first groove adopting the first structure when said first lens element is mounted, said first lens element being positioned relative to said light emitting element and being operable to convert divergent light emitted from said light emitting element to substantially parallel light, and said first projection portion supporting an external edge of said first lens portion and being disposed between said first groove and the external edge of said first lens portion when said first lens element is mounted;
a second lens element including a second lens portion formed at a surface of an optical substrate and a second projection portion that comes in contact with said second groove adopting the first structure when said second lens element is mounted, said second lens element being operable to convert the substantially parallel light to convergent light;
a wavelength dividing filter disposed at said third groove adopting the second structure and being operable to divide light into different wavelengths; and
a light receiving element at which light with a second wavelength having been divided through said wavelength dividing filter enters.

16. A subassembly according to claim 15, wherein said first and second lens portions are constituted of a diffractive optical element.

17. A subassembly according to claim 15, wherein the optical substrate is a silicon crystal substrate.

18. A subassembly according to claim 15, wherein said first and second lens elements are not ball lenses.

19. A subassembly according to claim 15, wherein said first and second lens elements each include a rectangular handling portion extending in a direction orthogonal to a direction in which said first and second grooves adopting the first structure extend.

20. A subassembly according to claim 15, wherein said first lens portion of said first lens element is operable to cause a light flux to enter therefrom in a direction which is different from the direction of an incident light flux emitted from said light emitting element.

21. A subassembly according to claim 15, wherein said first projection portion of said first lens element and said second projection portion of said second lens element are operable to be placed in contact with said first and second grooves, respectively, so as to align an optical axis of each of said first lens portion and said second lens portion with an optical axis of said light emitting element.

22. A subassembly according to claim 15, wherein said second projection portion is arranged to support an external edge of said second lens portion and is disposed between said second groove and the external edge of said second lens portion when said lens element is mounted.

23. An optical module comprising:
a supporting substrate having a first groove and a second groove both adopting a first structure and a third groove adopting a second structure, said third groove being positioned between said first groove and said second groove adopting the first structure;
a light emitting element mounted at said supporting substrate and operable to emit light with a first wavelength;
a first lens element including a first lens portion formed at a surface of an optical substrate and a first projection portion that comes in contact with said first groove adopting the first structure when said first lens element is mounted, said first lens element being positioned relative to said light emitting element and being operable to convert divergent light emitted from said light emitting element to substantially parallel light, and said first projection portion supporting an external edge of said first lens portion and being disposed between said first groove and the external edge of said first lens portion when said first lens element is mounted;
a second lens element including a second lens portion formed at a surface of an optical substrate and a second projection portion that comes in contact with said second groove adopting the first structure when said second lens element is mounted, said second lens element being operable to convert the substantially parallel light to convergent light;
a wavelength dividing filter disposed at said third groove adopting the second structure and being operable to divide light into different wavelengths;
a light receiving element at which light with a second wavelength having been divided through said wavelength dividing filter enters;
one or more package components used to package said supporting substrate having said light emitting element, said first lens element, said second lens element and said wavelength dividing filter mounted thereat and said light receiving element; and
an interface including an optical fiber at which light with the first wavelength having been converted to convergent light enters and light with the second wavelength exits toward said second lens element, said interface being positioned as said interface comes in contact with said package component.

24. An optical module according to claim 23, wherein said supporting substrate and said light receiving element are held in an airtight space formed by said package components.

25. An optical module according to claim 23, wherein said one or more package components are coaxial package components.

26. An optical module according to claim 23, wherein said first and second lens elements are not ball lenses.

27. An optical module according to claim 23, wherein said first and second lens elements each include a rectangular handling portion extending in a direction orthogonal to a direction in which said first and second grooves adopting the first structure extend.

28. An optical module according to claim 23, wherein said first lens portion of said first lens element is operable to cause a light flux to enter therefrom in a direction which is different from the direction of an incident light flux emitted from said light emitting element.

29. An optical module according to claim 23, wherein said first projection portion of said first lens element and said second projection portion of said second lens element are operable to be placed in contact with said first and second grooves, respectively, so as to align an optical axis of each of said first lens portion and said second lens portion with an optical axis of said light emitting element.

30. An optical module according to claim 23, wherein said second projection portion is arranged to support an external edge of said second lens portion and is disposed between said second groove and the external edge of said second lens portion when said lens element is mounted.

* * * * *